United States Patent
Tsukamoto et al.

(10) Patent No.: US 9,207,741 B2
(45) Date of Patent: Dec. 8, 2015

(54) STORAGE APPARATUS, CONTROLLER MODULE, AND STORAGE APPARATUS CONTROL METHOD

(71) Applicant: FUJITSU LIMITED, Kawasaki-shi, Kanagawa (JP)

(72) Inventors: Nina Tsukamoto, Koutou (JP); Shigeyuki Maeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 320 days.

(21) Appl. No.: 13/789,710

(22) Filed: Mar. 8, 2013

(65) Prior Publication Data

US 2013/0185582 A1    Jul. 18, 2013

Related U.S. Application Data

(63) Continuation of application No. PCT/JP2010/066022, filed on Sep. 16, 2010.

(51) Int. Cl.
G06F 1/00     (2006.01)
G06F 1/32     (2006.01)
G06F 3/06     (2006.01)

(52) U.S. Cl.
CPC ............ *G06F 1/3225* (2013.01); *G06F 3/0625* (2013.01); *G06F 3/0653* (2013.01); *G06F 3/0658* (2013.01); *G06F 3/0674* (2013.01); *Y02B 60/1246* (2013.01)

(58) Field of Classification Search
CPC .... G06F 1/3225; G06F 3/0625; G06F 3/0653
See application file for complete search history.

(56) References Cited

U.S. PATENT DOCUMENTS

2006/0215525 A1*   9/2006   Oyama et al. ............... 369/59.19
2010/0169688 A1*   7/2010   Suzuki .......................... 713/324

FOREIGN PATENT DOCUMENTS

| JP | 4-265624 | 9/1992 |
| JP | 9-128160 | 5/1997 |
| JP | 2003-36660 | 2/2003 |
| JP | 2006-190197 | 7/2006 |
| JP | 2008-117000 | 5/2008 |
| JP | 2010-157024 | 7/2010 |

OTHER PUBLICATIONS

Patent Abstracts of Japan, Publication No. 04-265624, Published Sep. 21, 1992.
Patent Abstracts of Japan, Publication No. 2003-036660, Published Feb. 7, 2003.

(Continued)

*Primary Examiner* — Jaweed A Abbaszadeh
*Assistant Examiner* — Austin Hicks
(74) *Attorney, Agent, or Firm* — Staas & Halsey LLP

(57) ABSTRACT

A storage apparatus includes first and second controller modules. The first controller module monitors power states of the first and second controller modules. When the monitoring results indicate that the power state of the first controller module is an ON state and the power state of the second controller module is an ON processing state in which an ON process of switching from OFF to ON is being executed, the first controller module maintains the power state of the first controller module upon detection of a power control signal for controlling the power state of the first controller module.

16 Claims, 13 Drawing Sheets

RELATIONSHIP BETWEEN STATES OF CONTROLLER MODULES AND THEIR ACTIONS IN RESPONSE TO POWER CONTROL OPERATION

| STATE | | | | ACTION IN RESPONSE TO POWER CONTROL OPERATION | |
|---|---|---|---|---|---|
| NO. | CM#0 | CM#1 | SYSTEM | CM#0 | CM#1 |
| 5 | OFF | ON | SYSTEM ERROR (UNEXPECTED SITUATION) | RECEIVE OFF COMMAND FROM CM#1 NO ACTION | TURN OFF CM#0, AND THEN START OFF PROCESS → OFF PROCESSING |
| | OFF BY OFF COMMAND FROM CM#1 | | NON-REDUNDANT ON | NO ACTION | START OFF PROCESS → OFF PROCESSING |
| 6 | OFF | OFF | OFF | START ON PROCESS → ON PROCESSING | START ON PROCESS → ON PROCESSING |
| | OFF BY OFF COMMAND FROM CM#1 | | NON-REDUNDANT OFF | "OFF" (MAINTAIN CURRENT STATE) | |
| 7 | OFF | ON PROCESSING | SYSTEM ERROR (UNEXPECTED SITUATION) | "OFF" (MAINTAIN CURRENT STATE) | "ON PROCESSING" (CONTINUE ON PROCESS) |
| | OFF BY OFF COMMAND FROM CM#1 | | NON-REDUNDANT ON PROCESSING | | |
| 8 | OFF | OFF PROCESSING | OFF PROCESSING | "OFF" (MAINTAIN CURRENT STATE) | "OFF PROCESSING" (CONTINUE OFF PROCESS) |
| | OFF BY OFF COMMAND FROM CM#1 | | NON-REDUNDANT OFF PROCESSING | | |

(56) References Cited

OTHER PUBLICATIONS

Patent Abstracts of Japan, Publication No. 2010-157024, Published Jul. 15, 2010.
Patent Abstracts of Japan, Publication No. 09-128160, Published May 16, 1997.
Patent Abstracts of Japan, Publication No. 2006-190197, Published Jul. 20, 2006.
Patent Abstracts of Japan, Publication No. 2008-117000, Published May 22, 2008.
International Search Report of PCT/JP/2010/066022 mailed Nov. 9, 2010.

* cited by examiner

RELATIONSHIP BETWEEN STATES OF CONTROLLER MODULES AND THEIR ACTIONS IN RESPONSE TO POWER CONTROL OPERATION

| NO. | STATE CM#0 | STATE CM#1 | SYSTEM | ACTION IN RESPONSE TO POWER CONTROL OPERATION CM#0 | ACTION IN RESPONSE TO POWER CONTROL OPERATION CM#1 |
|---|---|---|---|---|---|
| 1 | ON | ON | ON | START OFF PROCESS → OFF PROCESSING | START OFF PROCESS → OFF PROCESSING |
| 2 | ON | OFF | SYSTEM ERROR (UNEXPECTED SITUATION) | TURN OFF CM#1, AND THEN START OFF PROCESS → OFF PROCESSING | RECEIVE OFF COMMAND FROM CM#0 NO ACTION (MAINTAIN CURRENT STATE) |
|   |    | OFF BY OFF COMMAND FROM CM#0 | NON-REDUNDANT ON | START OFF PROCESS → OFF PROCESSING | NO ACTION (MAINTAIN CURRENT STATE) |
| 3 | ON | ON PROCESSING | ON PROCESSING | "ON" (MAINTAIN CURRENT STATE) | "ON PROCESSING" (CONTINUE ON PROCESS) |
|   |    | ON PROCESSING BY ON COMMAND FROM CM#0 | CM#1 INCORPORATION PROCESSING |  |  |
| 4 | ON | OFF PROCESSING | SYSTEM ERROR (UNEXPECTED SITUATION) | TURN OFF CM#1, AND THEN START OFF PROCESS → OFF PROCESSING | RECEIVE OFF COMMAND FROM CM#0 "OFF PROCESSING" (CONTINUE OFF PROCESS) |
|   |    | OFF PROCESSING BY OFF COMMAND FROM CM#0 | CM#1 DISCONNECTION PROCESSING | START OFF PROCESS → OFF PROCESSING | "OFF PROCESSING" (CONTINUE OFF PROCESS) |

FIG. 4

RELATIONSHIP BETWEEN STATES OF CONTROLLER MODULES AND THEIR ACTIONS IN RESPONSE TO POWER CONTROL OPERATION

| STATE NO. | CM#0 | CM#1 | SYSTEM | ACTION IN RESPONSE TO POWER CONTROL OPERATION CM#0 | CM#1 |
|---|---|---|---|---|---|
| 5 | OFF | ON | SYSTEM ERROR (UNEXPECTED SITUATION) | RECEIVE OFF COMMAND FROM CM#1 NO ACTION | TURN OFF CM#0, AND THEN START OFF PROCESS → OFF PROCESSING |
|   | OFF BY OFF COMMAND FROM CM#1 |   | NON-REDUNDANT ON | NO ACTION | START OFF PROCESS → OFF PROCESSING |
| 6 | OFF | OFF | OFF | START ON PROCESS → ON PROCESSING | START ON PROCESS → ON PROCESSING |
|   | OFF BY OFF COMMAND FROM CM#1 |   | NON-REDUNDANT OFF | "OFF" (MAINTAIN CURRENT STATE) |   |
| 7 | OFF | ON PROCESSING | SYSTEM ERROR (UNEXPECTED SITUATION) | "OFF" (MAINTAIN CURRENT STATE) | "ON PROCESSING" (CONTINUE ON PROCESS) |
|   | OFF BY OFF COMMAND FROM CM#1 |   | NON-REDUNDANT ON PROCESSING |   |   |
| 8 | OFF | OFF PROCESSING | OFF PROCESSING | "OFF" (MAINTAIN CURRENT STATE) | "OFF PROCESSING" (CONTINUE OFF PROCESS) |
|   | OFF BY OFF COMMAND FROM CM#1 |   | NON-REDUNDANT OFF PROCESSING |   |   |

FIG. 5

RELATIONSHIP BETWEEN STATES OF CONTROLLER MODULES AND THEIR ACTIONS IN RESPONSE TO POWER CONTROL OPERATION

| STATE | | | | ACTION IN RESPONSE TO POWER CONTROL OPERATION | |
|---|---|---|---|---|---|
| NO. | CM#0 | CM#1 | SYSTEM | CM#0 | CM#1 |
| 9 | ON PROCESSING | ANY | | "ON PROCESSING" (CONTINUE ON PROCESS) | |
| 10 | OFF PROCESSING | ANY | | "OFF PROCESSING" (CONTINUE OFF PROCESS) | |

FIG. 6

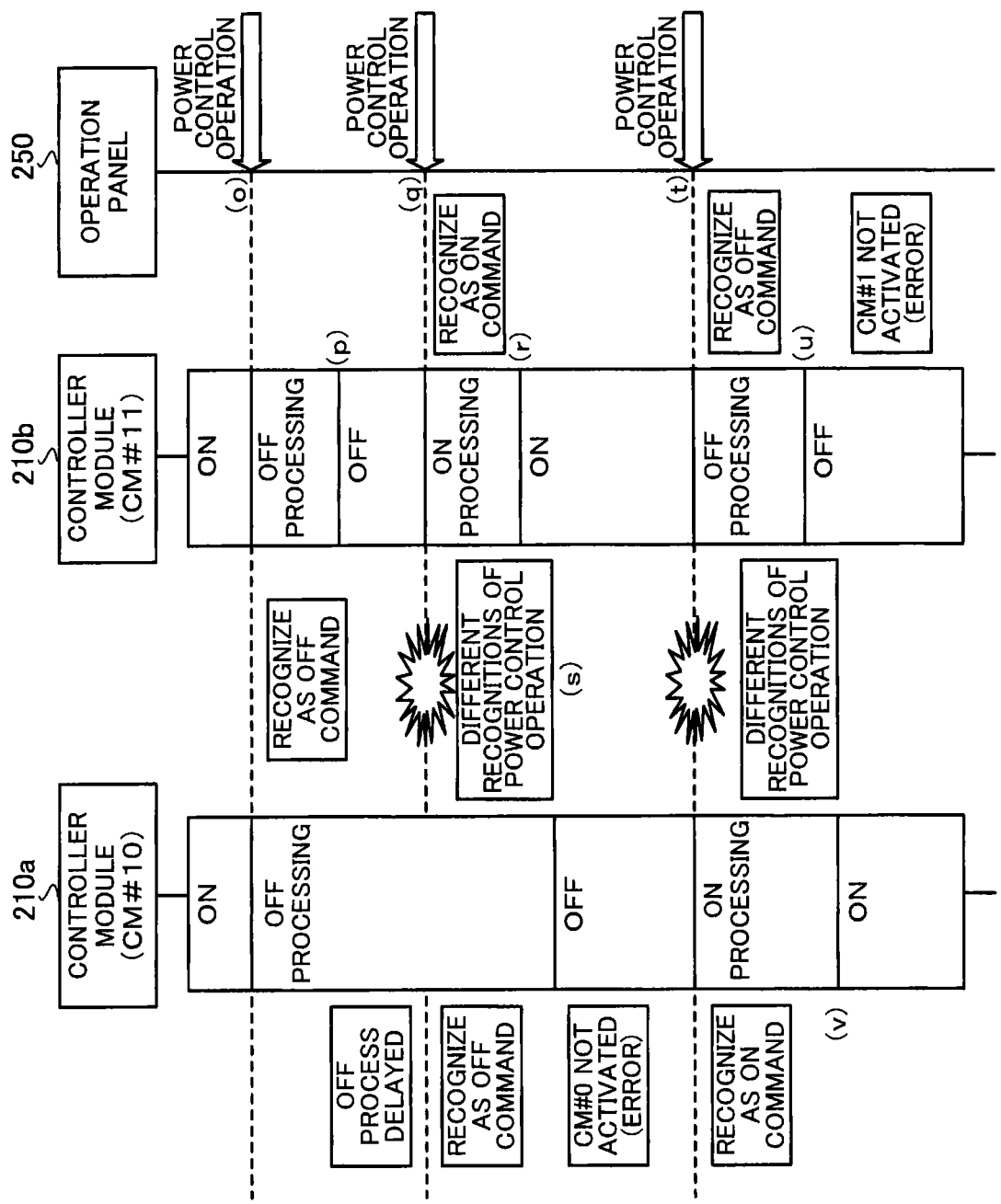

STORAGE APPARATUS, CONTROLLER MODULE, AND STORAGE APPARATUS CONTROL METHOD

CROSS-REFERENCE TO RELATED APPLICATION

This application is a continuation application of International Application PCT/JP2010/066022 filed on Sep. 16, 2010 and designated the U.S., the entire contents of which are incorporated herein by reference.

FIELD

The embodiments discussed herein are related to a storage apparatus, a controller module, and a storage apparatus control method.

BACKGROUND

There are storage apparatuses using storage media such as magnetic disks, magneto-optical disks, optical discs, and the like, and efforts are being made to increase their storage capacity. For increasing the capacity of such storage apparatuses, a technology called RAID (Redundant Arrays of Inexpensive Disks) that uses multiple storage media to constitute a storage apparatus is widely used.

In some storage apparatuses, multiple controller modules are provided in order to provide redundancy and thereby to improve the reliability, or in order to provide function distribution and thereby to increase the processing speed. Each controller module is configured to control the entire operations of the storage apparatus. In the storage apparatus, power control operation for controlling power ON and OFF of each of the multiple controller modules is performed.

There are known techniques for power control between a plurality of devices (see, for example, Japanese Laid-open Patent Publications No. 04-265624 and No. 2003-36660).

In order to maintain redundancy and function distribution, the power states of the controller modules of the storage apparatus need to be maintained consistent with each other. For example, when one controller module is in an ON state in which the controller module is supplied with power and is operating normally, the other controller module needs to be in the ON state as well. Similarly, when one controller module is in an OFF state, the other controller module needs to be in the OFF state as well.

However, in the case where, for example, a command for powering ON a controller module and a command for powering OFF a controller module are generated by the same power control operation, the power states of the controller modules of the storage apparatus might become inconsistent with each other. Further, this inconsistency might be difficult to be resolved.

More specifically, in some cases, multiple controller modules of a storage apparatus operate independently of each other. In such a case, for example, upon executing an OFF process of the controller modules so as to switch the power state of the storage apparatus from ON to OFF, if the controller modules are writing data from a cache memory to the storage, the controller modules are powered OFF after completion of the writing. However, since the amount of data to be written from the cache memory differs between the controller modules, the time taken to complete the writing may differ between the controller modules. This may cause power state inconsistency between the controller modules.

The following describes occurrence of such power state inconsistency between controller modules with reference to FIG. 13.

FIG. 13 illustrates an example in which a power state inconsistency occurs between controller modules due to a power control operation. As illustrated in FIG. 13, in the case where the user performs a power control operation on controller modules 210a (CM#10) and 210b (CM#11) of a storage apparatus from an operation panel 250, if the power states of the controller modules 210a and 210b are inconsistent with each other (for example, if the controller module 210a is in an ON state and the controller module 210b is in an OFF state), recognition of the power control operation differs between the controller modules 210a and 210b. Then, the controller modules 210a and 210b are placed in different power states, which may result in malfunctioning of the storage apparatus.

More specifically, as illustrated in FIG. 13, the controller modules 210a and 210b are initially in the ON state. At this point, as illustrated in (o) of FIG. 13, in order to terminate operations of the storage apparatus, the user performs the first power control operation using the operation panel 250. Each of the controller modules 210a and 210b, which are in the ON state, recognizes the power control operation of (O) as a command for turning OFF its power. Thus, each of the controller modules 210a and 210b starts an OFF process of turning OFF its power. Then, as illustrated in (p) of FIG. 13, the OFF process in the controller module 210b is completed, so that the controller module 210b is powered OFF. On the other hand, at this point, the OFF process in the controller module 210a is delayed, so that the controller module 210a is in an OFF processing state.

Then, as illustrated in (q) of FIG. 13, while the controller module 210a is executing the delayed OFF process, the user performs the second power control operation so as to activate the storage apparatus. The controller module 210a in the OFF processing state recognizes the power control operation of (q) as an OFF command, and therefore continues the OFF process. On the other hand, the controller module 210b in the OFF state recognizes the power control operation of (q) as an ON command for turning ON its power, and therefore starts an ON process for turning ON its power. In this way, since the power states of the controller modules 210a and 210b do not match each other at the point of (q), recognition of the power control operation of (q) differs between the controller modules 210a and 210b. As a result, the states of the controller modules 210a and 210b become inconsistent with each other.

Then, as illustrated in (r) of FIG. 13, the ON process of the controller module 210b corresponding to the power control operation of (q) is completed. Thus, the controller module 210b is powered ON. Then, as illustrated in (s) of FIG. 13, the OFF process of the controller module 210b corresponding to the power control operation of (o) is completed. Thus, the controller module 210a is powered OFF. As a result, although the user performed the power control operation in (q) so as to activate the storage apparatus, an error event occurs in which while the controller module 210b is powered ON and activated, the controller module 210a is powered OFF and is not activated.

Then, as illustrated in (t) of FIG. 13, in order to resolve the power state inconsistency between the controller modules 210a and 210b and to power ON both the controller modules 210a and 210b, the user performs the third power control operation. The controller module 210a in the OFF state recognizes the power control operation of (t) as an ON command, and therefore starts an ON process. On the other hand, the controller module 210b in the ON state recognizes the power control operation of (t) as an OFF command, and therefore starts an OFF process. In this way, since the power states of the controller modules 210a and 210b do not match each other at the point of (t), recognition of the power control operation of (t) differs between the controller modules 210a and 210b. As a result, the state inconsistency between the controller modules 210a and 210b continues without being resolved.

Then, as illustrated in (u) of FIG. 13, the OFF process of the controller module 210b corresponding to the power control operation of (t) is completed. Thus, the controller module 210b is powered OFF. Then, as illustrated in (v) of FIG. 13, the ON process of the controller module 210a corresponding to the power control operation of (t) is completed. Thus, the controller module 210a is powered ON. As a result, although the user performed the power control operation in (t) so as to activate the storage apparatus, the error event continues without being resolved, in which while the controller module 210b is powered OFF and not activated, the controller module 210a is powered ON and activated.

SUMMARY

According to one aspect of the invention, there is provided a storage apparatus that includes first and second controller modules, wherein the first controller module monitors power states of the first and second controller modules, and when the power state of the first controller module is an ON state and the power state of the second controller module is an ON processing state in which an ON process of switching from OFF to ON is being executed, the first controller module maintains the power state of the first controller module upon detection of a power control signal for controlling the power state of the first controller module.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a relationship between the states of controller modules and their actions in response to a power control operation according to the second embodiment;

FIG. 5 illustrates the relationship between the states of controller modules and their actions in response to a power control operation according to the second embodiment;

FIG. 6 illustrates the relationship between the states of controller modules and their actions in response to a power control operation according to the second embodiment;

FIG. 13 illustrates an example in which a power state inconsistency occurs between controller modules due to a power control operation.

DESCRIPTION OF EMBODIMENTS

Figure 1:
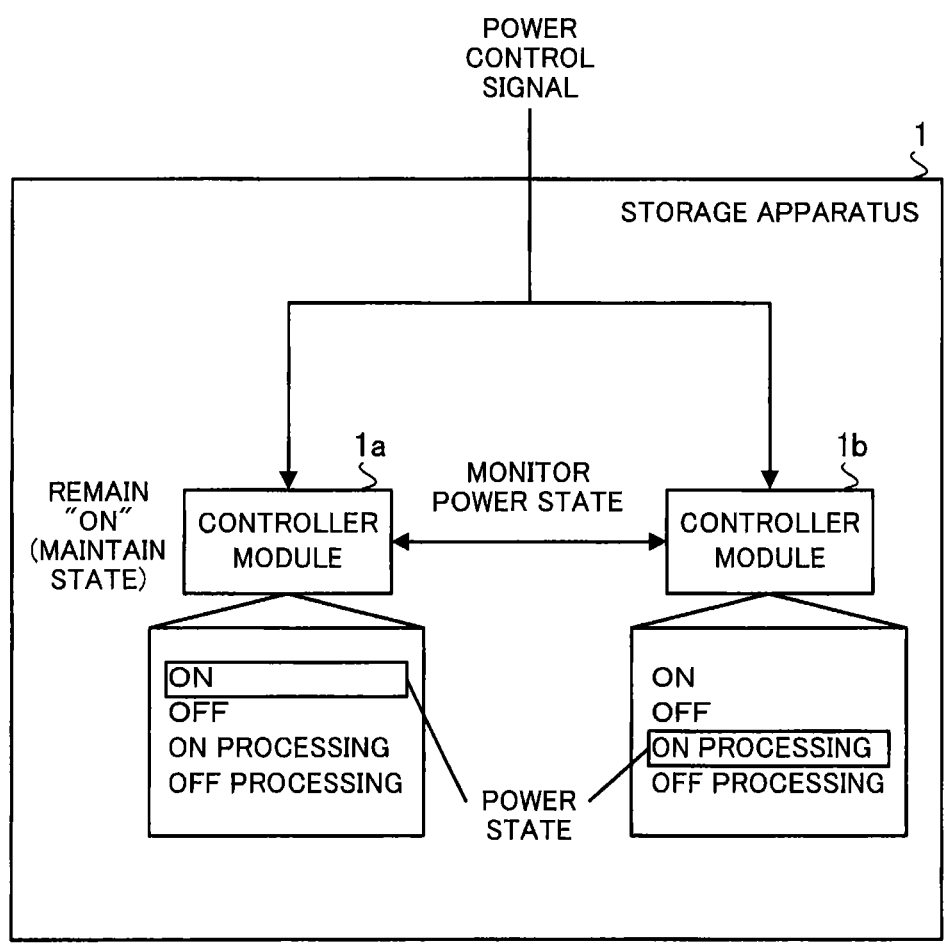
FIG. 1 illustrates a storage apparatus according to a first embodiment.

Several embodiments will be described below with reference to the accompanying drawings, wherein like reference numerals refer to like elements throughout.

(a) First Embodiment

FIG. 1 illustrates a storage apparatus 1 according to a first embodiment. The storage apparatus 1 of this embodiment includes controller modules 1a and 1b. The controller modules 1a and 1b of the storage apparatus 1 are duplexed for redundancy. In the storage apparatus 1 of this embodiment, during normal operations in which both the controller modules 1a and 1b are operating normally, the controller modules 1a and 1b perform reading and writing of different data independently of each other. However, the embodiment is not limited thereto, and the controller modules 1a and 1b may perform reading and writing of the same data in parallel.

The controller module 1a controls the storage apparatus 1. For example, the controller module 1a controls reading and writing of data in the storage apparatus 1. Also, the controller module 1a monitors the power states of the controller module 1a and the controller module 1b. The power state of the controller module 1a includes four states: an ON state in which the controller module is supplied with power and is operating normally, an OFF state in which the controller module is not supplied with power and is not operating, an OFF processing state in which an OFF process of switching from ON to OFF is being executed, and an ON processing state in which an ON process of switching from OFF to ON is being executed. The controller module 1a detects the power states of the controller module 1a at each time point, and stores power state information indicating the detected power state. Similarly, the controller module 1b stores power state information. The controller modules 1a and 1b may obtain power state information from each other, and thereby detect the power state of each other.

If the monitoring results indicate that the controller module 1a is in the ON state and the controller module 1b is in the ON processing state in which an ON process of switching the power state from OFF to ON is being executed, the controller module 1a maintains the controller module 1a in the ON state when a power control signal for controlling the power state of the controller module 1a is detected. A power control signal may be output to the controller modules 1a and 1b on the basis of a user's operation on an operation unit (not illustrated) in order to control the power state of the storage apparatus 1, or may be output from an upper apparatus such as a host computer, a client, and the like.

In this embodiment, a power control signal is output to each of the controller modules 1a and 1b. However, the embodiment is not limited thereto. A power control signal may be output to either one of the controller modules 1a and 1b (for example, the controller module 1*a*), and the controller module 1*a* having detected the power control signal may report to the other (for example, the controller module 1*b*) the detection of the power control signal.

Similar to the controller module 1*a*, the controller module 1*b* controls the storage apparatus 1. Also, the controller module 1*b* monitors the states of the controller modules 1*a* and 1*b*, and controls the states of the controller modules 1*a* and 1*b* in accordance with the monitoring results. In other words, each of the controller modules 1*a* and 1*b* monitors the own power state and that of the other, and controls the states of the controller modules 1*a* and 1*b* in accordance with the monitoring results. The configuration of the controller module 1*b* is the same as that of the controller module 1*a*, and therefore a description thereof will be omitted.

As described above, in this embodiment, if, for example, the monitoring results indicate that the controller module 1*a* is in the ON state and the controller module 1*b* is in the ON processing state, even when a power control signal is detected, the controller module 1*a* is maintained in the ON state. This prevents, in the above situation, in accordance with the power control signal, the controller module 1*a* from starting execution of an OFF process of switching its power state from ON to OFF, and also prevents the controller module 1*b* from switching its power state to OFF. This makes it possible to prevent power state inconsistency between the controller modules 1*a* and 1*b* of the storage apparatus 1.

(b) Second Embodiment

Next, a second embodiment will be described. In the second embodiment, the function of the storage apparatus 1 of FIG. 1 of causing the controller modules 1*a* and 1*b* to monitor the power state of each other so as to prevent power state inconsistency between the controller modules 1*a* and 1*b* is implemented by a storage apparatus 100 including storage device groups that constitute RAID.

Figure 2:
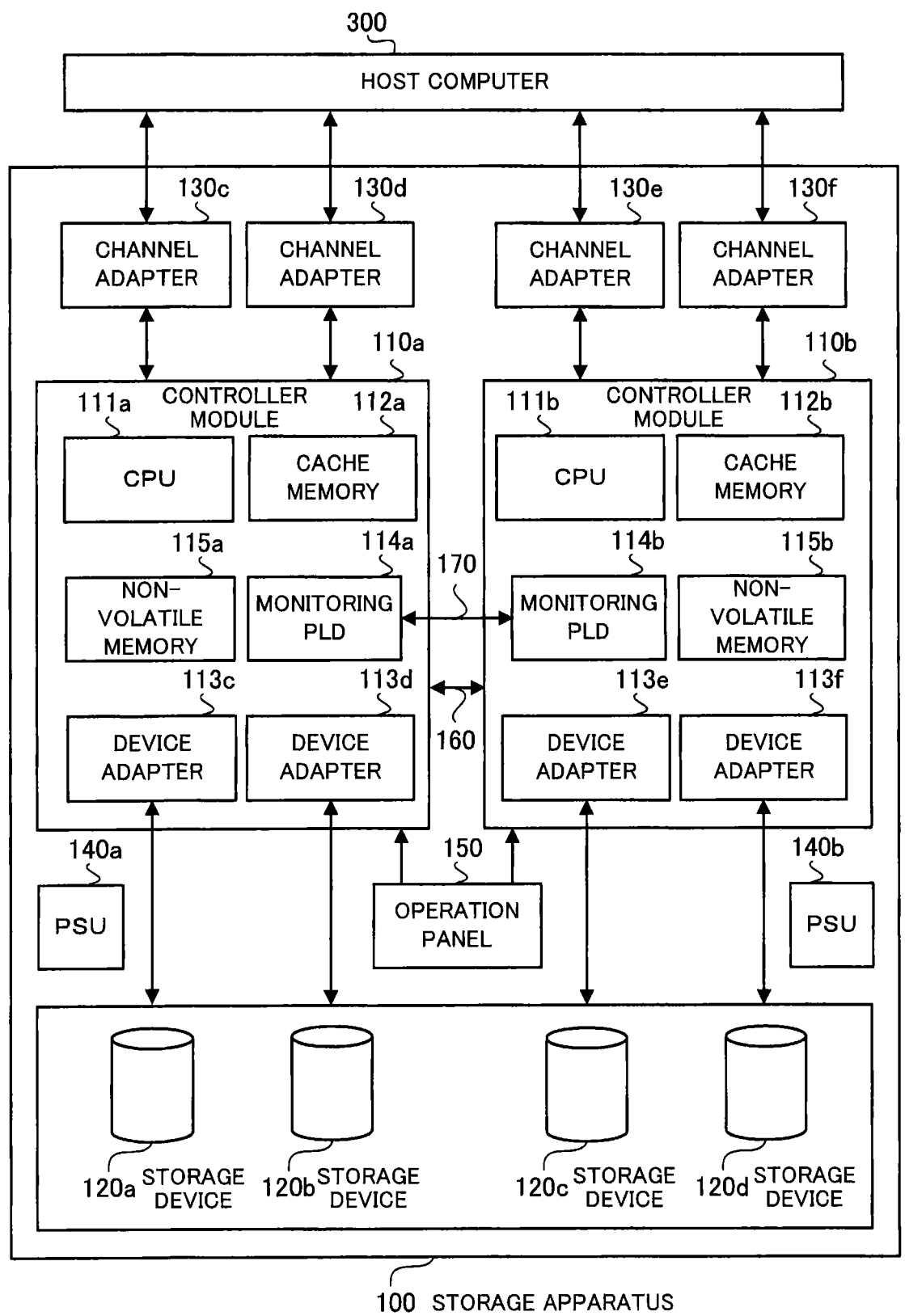
FIG. 2 illustrates the hardware configuration of a storage apparatus according to a second embodiment.

FIG. 2 illustrates the hardware configuration of the storage apparatus 100 according to the second embodiment. The storage apparatus 100 includes controller modules 110*a* and 110*b* that control the entire operations of the storage apparatus 100, channel adapters 130*c* through 130*f* that control connection between the controller modules 110*a* and 110*b* and a host computer 300, storage devices 120*a*, 120*b*, 120*c*, and 120*d*, power supply units (PSUs) 140*a* and 140*b*, and an operation panel 150.

The storage apparatus 100 inputs data from and outputs data to a plurality of storage devices such as hard disk drives (HDDs) (described below) and the like. The storage apparatus 100 has a RAID function such as RAID 0 through 6 and the like. In the storage apparatus 100, a group of a plurality of storage devices constitute RAID, and each RAID is managed as one storage device.

The host computer 300 is a computer that executes task processing, and is connected to the storage apparatus 100 for data communication via a storage area network (SAN) with Fibre Channels. The host computer 300 stores data used for task processing in the storage apparatus 100 and reads the data from the storage apparatus 100.

The controller module 110*a* includes a central processing unit (CPU) 111*a*, a cache memory 112*a*, device adapters 113*c* and 113*d*, a monitoring programmable logic device (monitoring PLD) 114*a*, and a non-volatile memory 115*a*.

The CPU 111*a* executes processing in accordance with the operating system (OS) and the like so as to perform various control operations. The controller module 110*a* manages resources such as the cache memory 112*a*, the monitoring PLD 114*a*, the storage devices 120*a*, 120*b*, 120*c* and 120*d*, the channel adapters 130*c* and 130*d*, and the like.

The CPU 111*a* controls the power of the storage apparatus 100 on the basis of an other system command flag that indicates a value corresponding to a power state command sent from the other system such as the controller module 110*b* or the like, an own system state flag that indicates a value corresponding to the power state of the controller module 110*a*, and an own system control flag that indicates a value corresponding to a control operation on the power state of the controller module 110*a* by the monitoring PLD 114*a*. These flags are stored in the cache memory 112*a*.

The CPU 111*a* obtains the value of the other system command flag which is set in the cache memory 112*a* by the monitoring PLD 114*a*, and controls the power state of the controller module 110*a* in accordance with the obtained value of the other system command flag. Further, the CPU 111*a* detects the power state of the controller module 110*a*, and sets a value corresponding to the detection results in the own system state flag. Furthermore, the CPU 111*a* controls the power state of the controller module 110*a* in accordance with the value of the own system control flag which is set by the CPU 111*a* or the monitoring PLD 114*a*.

Further, when controlling the power state of the other system such as the controller module 110*b* or the like, the CPU 111*a* sets a value corresponding to a command in an other system control register provided in the monitoring PLD 114*a*. In response, the monitoring PLD 114*a* sends a notification corresponding to the value that is set in the other system control register, and thereby provides a command from the controller module 110*a* to the controller module 110*b*. Furthermore, the CPU 111*a* obtains the value in an other system state register provided in the monitoring PLD 114*a* so as to recognize the power state of the other system.

The CPU 111*a* includes a timer that serves to monitor completion of an ON process of the controller module 110*b* when ON processes of the controller modules 110*a* and 110*b* are executed.

The cache memory 112*a* stores control data, such as the other system command flag, the own system state flag, the own system control flag, and the like, that are needed by the CPU 111*a* to control the storage apparatus 100. Further, the cache memory 112*a* temporarily stores input data read from and output data written to the storage devices 120*a* through 120*d*.

The device adapters 113*c* and 113*d* control connection to the storage devices 120*a* through 120*d*.

The monitoring PLD 114*a* performs power control of the controller module 110*a* in place of the CPU 111*a*, in the case where the CPU 111*a* is not operating due to the controller module 110*a* being in the OFF state, the ON processing state, or the OFF processing state. Even when the controller module 110*a* is in the OFF state, power is supplied to the monitoring PLD 114*a*. Therefore, the monitoring PLD 114*a* is capable of operating even when the controller module 110*a* is in the OFF state or the like.

Further, the monitoring PLD 114*a* is connected to the monitoring PLD 114*b* through a monitoring bus 170. The monitoring PLD 114*a* may exchange monitoring control packets such as status packets, control packets, and the like, with the monitoring PLD 114*b* through the monitoring bus 170.

Further, the monitoring PLD 114*a* includes an other system control register that indicates a value corresponding to a command from the CPU 111*a* to the other system such as the controller module 110*b* or the like, an other system state register that indicates a value corresponding to the power state of the other system, and an own system disconnection OFF register that indicates a value corresponding to a disconnected OFF state of the own system.

The disconnected OFF state is a state in which, when one of the controller modules (e.g., the controller module 110a) detects an error in the other controller module (e.g., the controller module 110b), the controller module 110b with the error is disabled in accordance with a disconnection OFF command from the controller module 110a that has detected the error. The disconnection OFF command is a command issued by the controller module 110a which has detected the error in the controller module 110b so as to disable the controller module 110b. The controller module 110b that has received the disconnection OFF command from the controller module 110a immediately starts an OFF process if the controller module 110b is in the ON state. After that, even if the controller module 110b in the OFF state receives a power control signal, the controller module 110b is not switched to the ON processing state and thereby maintains the OFF state.

When a value corresponding to a power state command to the controller module 110b is set in the other system control register by the CPU 111a, the monitoring PLD 114a sends to the monitoring PLD 114b a control packet corresponding to the value set in the other system control register by the CPU 111a, and thereby issues a power state command to the controller module 110b. Further, the monitoring PLD 114a receives from the monitoring PLD 114b a control packet indicating a power state command to the controller module 110a. Thus the monitoring PLD 114a receives from the monitoring PLD 114b the power state command to the controller module 110a, and sets a value corresponding to the received control packet in the other system command flag of the CPU 111a. The monitoring PLD 114a controls the power state of the controller module 110a in accordance with the power state command indicated in the received control packet.

Further, the monitoring PLD 114a receives from the monitoring PLD 114b a status packet indicating the power state of the controller module 110b, and thereby detects the power state of the controller module 110b. The monitoring PLD 114a sets a value corresponding to the received status packet in the other system state register.

The monitoring PLD 114a obtains the value of the own system state flag corresponding to the power state of the controller module 110a from the CPU 111a so as to recognize the power state of the controller module 110a. The monitoring PLD 114a sends to the monitoring PLD 114b a status packet corresponding to the obtained value of the own system state flag, and thereby reports the power state of the controller module 110a to the controller module 110b.

Further, the monitoring PLD 114a receives a power control signal indicating that a power control operation is performed on the operation panel 150. If the CPU 111a is not operating, the monitoring PLD 114a controls the power state of the controller module 110a in accordance with the received power control signal. When the CPU 111a is operating, the monitoring PLD 114a sets a value corresponding to information indicated by the received power control signal to the own system control flag in the CPU 111a. The CPU 111a obtains the value of the own system control flag, and controls the power state of the controller module 110a in accordance with the value of the own system control flag.

Further, when a value corresponding to the content of the command to the other system is set in the other system control register of the monitoring PLD 114a by the CPU 111a, the monitoring PLD 114a sends a notification corresponding to the set value, which corresponds to the command to the other system, to the monitoring PLD 114b through the monitoring bus 170.

The monitoring PLD 114a includes a timer that monitors completion of an OFF process of the controller module 110b when OFF processes of the controller modules 110a and 110b are executed.

In this embodiment, the monitoring PLD 114a performs power control of the controller module 110a in accordance with the power control signal from the operation panel 150. However, the embodiment is not limited thereto. The monitoring PLD 114a may be connected to the host computer 300 with a communication line such as a LAN and the like so as to receive a power control signal from the host computer 300, and may perform power control of the controller module 110a in accordance with the received power control signal. In this case, the monitoring PLD 114a may transfer the received power control signal to the monitoring PLD 114b of the controller module 110b through the monitoring bus 170. The monitoring PLD 114b may also be separately connected to the host computer 300.

The non-volatile memory 115a is a rewritable non-volatile semiconductor memory such as a flash memory and the like. The non-volatile memory 115a serves to hold data when the storage apparatus 100 is powered OFF. The CPU 111a temporarily writes, to the non-volatile memory 115a, data that are held in the cache memory 112a and are yet to be written to the storage devices 120a through 120d, and configuration information and the like of data that are already written to the storage devices 120a through 120d, during an OFF process of the controller module 110a. After that, when the controller module 110a is powered ON again, the CPU 111a reads and uses the data held in the non-volatile memory 115a.

The controller modules 110a and 110b are connected to each other via a bus 160. Control information and data are exchanged between the controller module 110a and the controller module 110b through the bus 160. Each of the controller modules 110a and 110b is detachably attached to the storage apparatus 100. The controller module 110b includes a CPU 111b, a cache memory 112b, device adapters 113e and 113f, a monitoring PLD 114b, and a non-volatile memory 115b. The configuration of the controller module 110b is the same as that of the controller module 110a, and therefore a description thereof will be omitted.

The storage devices 120a through 120d are hard disk drives that may constitute RAID, and store data of the system user or backup data that are sent from the host computer 300. Note that the data of the system user and backup data do not need to be stored in a single hard disk, and may be stored across a plurality of hard disks. Further, data of a plurality of users and backup data may be stored in a single hard disk. Examples of the storage devices 120a through 120d may include non-volatile memories, such as a solid state drive (SSD) and the like, and other storage media capable of storing data.

The channel adapters 130c through 130f control connection between the host computer 300 and the controller modules 110a and 110b. For example, the channel adapter 130c controls connection to the controller module 110a in response to a request from the host computer 300. Each of the controller modules 110a and 110b is connectable to corresponding two or more (two in FIG. 2) of the channel adapters 130c through 130f. More specifically, for example, the controller module 110a is connected each of the two different channel adapters 130c and 130d so as to realize a redundant configuration.

Note that communication between the channel adapters 130c through 130f and the host computer 300 is performed over a SAN with Fibre Channel connection. However, connection schemes other than Fibre Channel connection may be used. Further, communication between the channel adapters 130c through 130f and the host computer 300 may be performed using a dedicated line or a virtual private network (VPN) such that the storage apparatus 100 is located at a remote location from the host computer 300.

The power supply units 140a and 140b supply, to components of the storage apparatus 100, driving power for driving the components of the storage apparatus 100.

The operation panel 150 receives an operation such as a power control operation and the like by the user for instructing power ON or OFF of the storage apparatus 100, and sends an operation signal in accordance with the received operation to the controller modules 110a and 110b.

Note that, in FIG. 2, two controller modules 110a and 110b are provided, and each of the controller modules 110a and 110b includes two of the device adapters 113c through 113f and two of the channel adapters 130c through 130f. However, the number of these components may be arbitrarily chosen.

Further, in FIG. 2, only one host computer 300 is connected to the storage apparatus 100. However, a plurality of host computers may be connected to the storage apparatus 100.

Also, an extension device (not illustrated) controlled by the controller modules 110a and 110b and including a controller module and a storage device may be connected to the storage apparatus 100.

With the hardware configuration described above, the processing functions of this embodiment may be realized.

Figure 3:
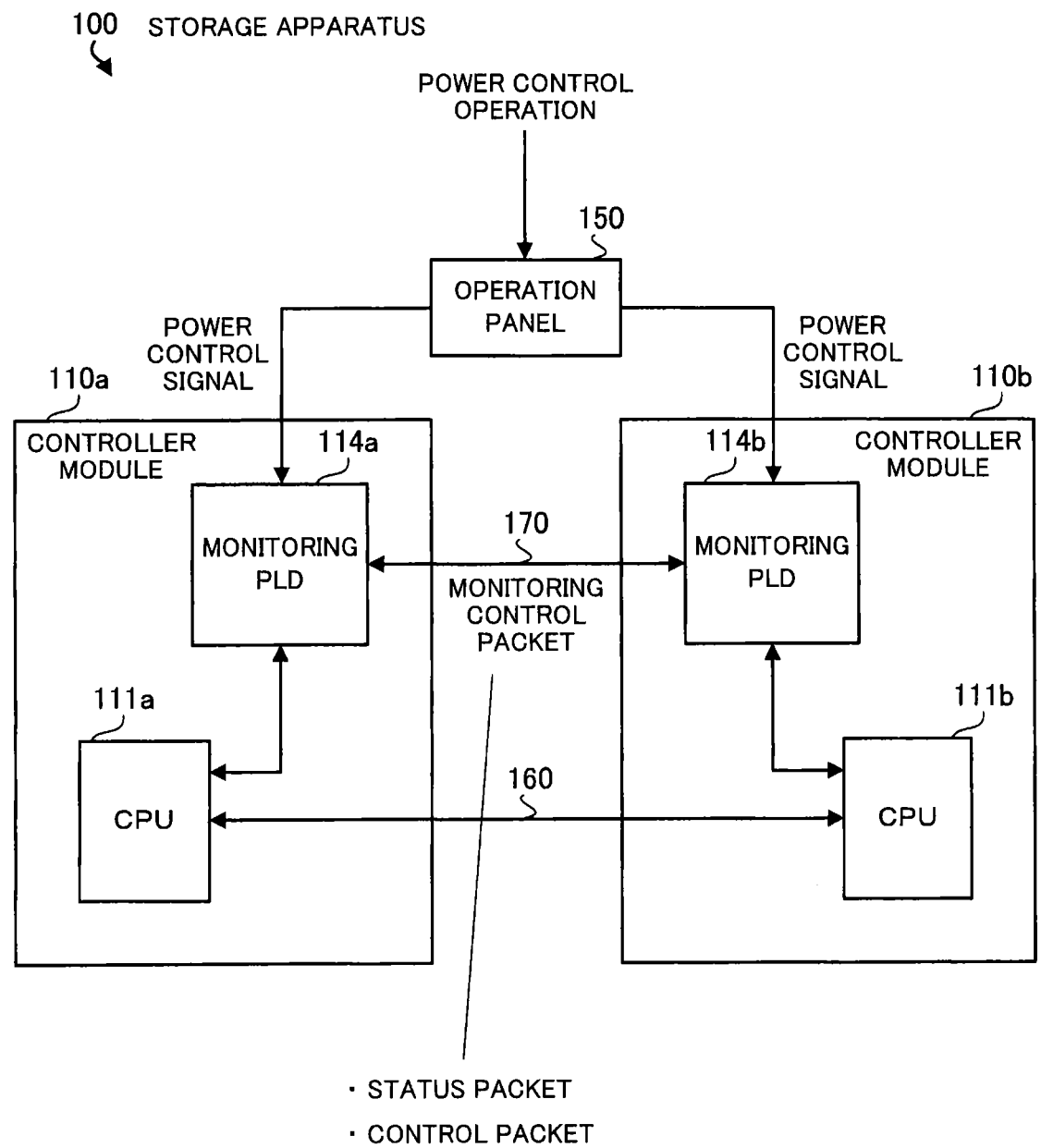
FIG. 3 is a functional block diagram of the storage apparatus according to the second embodiment.

FIG. 3 is a functional block diagram of the storage apparatus 100 according to the second embodiment. The storage apparatus 100 of this embodiment includes the controller modules 110a and 110b, and the operation panel 150. The controller module 110a includes the CPU 111a and the monitoring PLD 114a. The controller module 110b includes the CPU 111b and the monitoring PLD 114b. The CPUs 111a and 111b are connected to each other via the bus 160. The monitoring PLDs 114a and 114b are connected to each other via the monitoring bus 170. In the storage apparatus 100 of this embodiment, during normal operations in which both the controller modules 110a and 110b are operating normally, the controller modules 110a and 110b perform reading and writing of different data independently of each other. However, the embodiment is not limited thereto, and the controller modules 110a and 110b may perform reading and writing of the same data in parallel.

The controller module 110a controls the storage apparatus 100. For example, the controller module 110a controls reading and writing of data in the storage apparatus 100. Also, the controller module 110a monitors the power states of the controller module 110a and the controller module 110b. The power state of the controller module 110a includes four states: an ON state in which the controller module is supplied with power and is operating normally, an OFF state in which the controller module is not supplied with power and is not operating, an OFF processing state in which an OFF process of switching from ON to OFF is being executed, and an ON processing state in which an ON process of switching from OFF to ON is being executed.

The power state of the controller module 110a further includes a disconnection OFF processing state in which a disconnection OFF process for performing a disconnection OFF is being executed in response to a disconnection OFF command from the other system. The power state of the controller module 110a further includes a maintenance waiting state in which a disconnection OFF process is completed and execution of an ON process is prevented. The power state of the controller module 110a further includes an incorporation processing state in which the controller module 110a is incorporated into the storage apparatus 100 so as to replace a controller module with an error and is executing an ON process in accordance with an execution command from the other system (for example, the controller module 110b) in operation.

The power state of the controller module 110a is automatically reported to the other system (for example, the controller module 110b) in the form of a status packet, in response to a change in the state of the controller module 110a as a trigger. This reporting is performed even when the controller module 110a is not in the ON state.

The controller module 110a detects a power control signal output from the operation panel 150. However, the embodiment is not limited thereto. The host computer 300 may output a power control signal so as to control the power state of the storage apparatus 100, and the controller module 110a may detect the power control signal output from the host computer 300, through communication with each other. The controller module 110a may control the power state of the controller module 110a in accordance with the detected power control signal.

The power control signal is output to the controller modules 110a and 110b in accordance with an operation of a power control button on the operation panel 150 by the user so as to control the power state of the storage apparatus 100. The power control signal includes an ON command for instructing the controller module 110a or the controller module 110b to switch its state from OFF to ON, and an OFF command for instructing the controller module 110a or the controller module 110b to switch its state from ON to OFF.

In this embodiment, a power control signal is output to each of the controller modules 110a and 110b. However, the embodiment is not limited thereto. A power control signal may be output to either one of the controller modules 110a and 110b (for example, the controller module 110a), and the controller module 110a having detected the power control signal may report to the other (for example, the controller module 110b) the detection of the power control signal.

If the monitoring results indicate that the controller module 110a is in the ON state and the controller module 110b is in the ON processing state, even when a power control signal for controlling the power state of the controller module 110a is detected, the controller module 110a ignores the power control signal so as to maintain the controller module 110a in the ON state.

The controller module 110a monitors the power states of the controller modules 110a and 110b. If the controller module 110a is in the OFF state and the controller module 110b is in the OFF processing state, even when a power control signal for controlling the power state of the controller module 110a is detected, the controller module 110a ignores the power control signal so as to maintain the controller module 110a in the OFF state.

If the controller module 110a is in the ON processing state or the OFF processing state, when a power control signal for controlling the power state of the controller module 110a is detected, the controller module 110a maintains power state of the controller module 110a so as to complete the ON process or the OFF process, and continues execution of the ON process or the OFF process.

The controller modules 110a and 110b may perform operations independently of each other, and perform reading and writing of different data. In the case where an OFF process is executed in each of the controller modules 110a and 110b, the time taken to complete the OFF process may differ due to the differences between the controller modules 110a and 110b at the time of starting the OFF process, such as the differences in the amount of write data, configuration information of the storage devices, log information that are to be written to the storage devices 120a through 120d and the non-volatile memories 115a and 115b, and the like. If there is a difference in the time taken to complete an OFF process between the controller modules 110a and 110b, while an OFF process of one of the controller modules is still being executed, an OFF process of the other controller module may already be completed.

In the case where an OFF process of one of the controller modules is still being executed and an OFF process of the other controller module is already completed due to a difference between the time taken to complete an OFF process, if the power control button is operated and a power control signal is output from the operation panel 150 and is input to each controller module, one of the controller modules in the OFF processing state (ignores the power control signal, and) is turned OFF, and the other controller module in the OFF state executes an ON process so as to be turned ON. This results in a power state inconsistency between the two controller modules. Further, in the case where one of the controller modules is ON and the other controller module is OFF, if the power control button is operated and a power control signal is output, one of the controller modules in the ON state executes an OFF process so as to be turned OFF, and the other controller module in the OFF state executes an ON process so as to be turned ON. In this way, the power state inconsistency between the two controller modules continues.

On the other hand, in this embodiment, as described above, in the case where the controller module 110a is in the OFF state and the controller module 110b is in the OFF processing state, the controller module 110a ignores the power control signal so as to remain in the OFF state without executing an ON process. This makes it possible to prevent power state inconsistency between the controller modules 110a and 110b. The same applies to the case where the controller module 110a is in the ON state and the controller module 110b is in the ON processing state, and therefore a description thereof will be omitted.

Further, in the case where an ON process is executed in each of the controller modules 110a and 110b in accordance with a power control signal, the controller module 110a determines whether the ON process of the controller module 110b is completed within a predetermined time period (e.g., one second) after the controller module 110a is switched to the ON state, and thereby detects an error in the controller module 110b. The CPU 111a counts the time elapsed from when the ON process of the controller module 110a is completed, with use of a timer. If the ON process of the controller module 110b is not completed within the predetermined time period, an error is determined to have occurred in the controller module 110b.

Further, in the case where an OFF process is executed in each of the controller modules 110a and 110b in accordance with a power control signal, the controller module 110a determines whether the OFF process of the controller module 110b is completed within a predetermined time period (e.g., 0.1 second) after the controller module 110a is switched to the OFF state, and thereby detects an error in the controller module 110b. The monitoring PLD 114a counts the time elapsed from when the OFF process of the controller module 110a is completed, with use of a timer. If the OFF process of the controller module 110b is not completed within the predetermined time period, an error is determined to have occurred in the controller module 110b.

If an error is detected in the controller module 110b, the controller module 110a sends to the controller module 110b a disconnection OFF command for turning OFF the controller module 110b and preventing execution of an ON process. In this case, if the controller module 110b receives the disconnection OFF command from the controller module 110a, the controller module 110b is switched to the disconnected OFF state in which the controller module 110b is turned OFF, and is not switched to the ON state when a power control signal for controlling the power state of the controller module 110b is detected. When being switched to the disconnected OFF state, for example, the controller module 110b sets in the own system disconnection OFF register a value indicating that the controller module 110b is in the disconnected OFF state. When not in the disconnected OFF state and when being switched from the disconnected OFF state to the normal state, the controller module 110b sets in the own system disconnection OFF register a value indicating that the controller module 110b is not in the disconnected OFF state. Thus, the controller module 110b may determine whether the own system is set to the disconnected OFF state by referring to the own system disconnection OFF register. However, the embodiment is not limited thereto. When switched to the disconnected OFF state, the controller module 110b may be disabled without using the own system disconnection OFF register.

When switched to the disconnected OFF state, the controller module 110b ignores commands other than an ON command from the other system (for example, the controller module 110a), and does not execute an ON process even when a power control signal is received. However, when an ON command is received from the other system, the controller module 110b cancels the disconnection OFF and executes an ON process. In the case of cancelling the disconnection OFF of the controller module 110b, such as when the detected error is resolved, the other system sends an ON command to the controller module 110b such that the disconnected OFF state of the controller module 110b is canceled and an ON process is executed. Thus, the controller module 110b is enabled.

The CPU 111a operates and monitors the states of the controller modules 110a and 110b when the controller module 110a is in the ON state. On the basis of the monitoring results, the CPU 111a controls the power state of the controller module 110a and sends to the controller module 110b a command for controlling the power state of the controller module 110b.

The monitoring PLD 114a monitors the states of the controller modules 110a and 110b when the controller module 110a is not operating. On the basis of the monitoring results, the monitoring PLD 114a controls the power state of the controller module 110a and sends to the controller module 110b a command for controlling the power state of the controller module 110b. Further, the monitoring PLD 114a receives from the monitoring PLD 114b a report indicating the state of the controller module 110b, and monitors the state of the controller module 110b on the basis of the received report indicating the state of the controller module 110b.

Further, the monitoring PLD 114a is connected to the monitoring PLD 114b through the monitoring bus 170. The monitoring PLD 114a may exchange monitoring control packets, such as status packets, control packets, and the like, with the monitoring PLD 114b through the monitoring bus 170.

Similar to the controller module 110a, the controller module 110b controls the storage apparatus 100 using the CPU 111b and the monitoring PLD 114b. Also, the controller module 110b monitors the states of the controller modules 110a and 110b, and controls the states of the controller modules 110a and 110b in accordance with the monitoring results. The configuration of the controller module 110b is the same as that of the controller module 110a, and therefore a description thereof will be omitted.

The operation panel 150 includes the power control button (not illustrated). The operation panel 150 receives an operation of the power control button by the user, and outputs a power control signal in accordance with the received operation.

Note that, in this embodiment, the same signal serves as an ON command and an OFF command. However, the embodiment is not limited thereto, and an ON signal and an OFF signal may be different signals which are sometimes difficult to be distinguished from each other. For example, an ON command is output by pressing the power control button, while an OFF command is output by continuously pressing the power control button for a period of time greater than the period of time for which the power control button is pressed for issuing the ON command. As another example, an ON command is output by pressing the power control button one time, and an OFF command is output by pressing the power control button two times.

FIGS. 4 through 6 illustrate the relationship between the states of the controller modules and their actions in response to a power control operation according to the second embodiment. More specifically, FIGS. 4 through 6 illustrate actions of the controller modules 110a (CM#0) and 110b (CM#1) that are performed in response to a power control operation of the storage apparatus 100 (system) by the user in each combinations of the states of the controller module 110a, the controller module 110b, and the storage apparatus 100.

The "state" indicates the power state of each of the controller module 110a, the controller module 110b, and the storage apparatus 100 in each state number indicated in "NO.".

The "action in response to power control operation" indicates actions that are performed by the controller modules 110a and 110b when the controller modules 110a and 110b receive a power control signal which is output in response to a power control operation of the storage apparatus 100 by the user in each state.

In the state of number "1", both the controller modules 110a and 110b are in the "ON" state, and the storage apparatus 100 is also in the "ON" state. In this state, when the controller modules 110a and 110b receive a power control signal, both the controller modules 110a and 110b start an OFF process. In this way, when the controller modules 110a and 110b receive a power control signal in the state of number "1", both the controller modules 110a and 110b are switched to the OFF processing state.

In the state of number "2", the controller module 110a is in the "ON" state, and the controller module 110b is in the "OFF" state. In the case where the controller module 110b is in the OFF state without a disconnection OFF command from the controller module 110a, the storage apparatus 100 is in an unexpected situation in which the power states of the controller modules 110a and 110b do not match each other, and therefore the storage apparatus 100 is determined to have a "system error" on the basis of the states of the controller modules 110a and 110b. In this case, when the controller modules 110a and 110b receive a power control signal, the controller module 110a sends a disconnection OFF command to the controller module 110b (at this point, the controller module 110b is already in the OFF state). Subsequently, the controller module 110a confirms that the controller module 110b is placed in the OFF state, and then starts an OFF process of the controller module 110a. The controller module 110b receives the disconnection OFF command from the controller module 110a. Although the controller module 110b is already in the OFF state and therefore does not perform any action at this point, the controller module 110b is prevented from executing an ON process from then on. In appears without a disconnection OFF command from the controller module 110a, when the controller modules 110a and 110b receive a power control signal, the controller module 110a is switched to the OFF processing state. Meanwhile, the controller module 110b maintains its current state without any change.

On the other hand, there may be a case where the controller module 110a that is already in the "ON" state sends a disconnection OFF command to the controller module 110b due to detection of an error in the controller module 110b by the controller module 110a, and therefore the controller module 110b is placed in the "OFF" state. In this case, the storage apparatus 100 is in a "non-redundant ON" state. In this state, the storage apparatus 100 is in the ON state with the controller module 110a enabled and the controller module 110b disabled. When the storage apparatus 100 is in this non-redundant state, one of the controller modules (for example, the controller module 110b) does not operate, and the other controller module (for example, the controller module 110a) operates. In this case, when the controller modules 110a and 110b receive a power control signal, since the controller module 110a has already sent a disconnection OFF command to the controller module 110b and therefore the controller module 110b is already in the OFF state, the controller module 110a starts an OFF process of the controller module 110a. On the other hand, in accordance with the disconnection OFF command, the controller module 110b is already prevented from executing an ON process, and does not perform any action. In this way, in the case where the state of number "2" appears due to a disconnection OFF command that has been previously sent from the controller module 110a, when the controller modules 110a and 110b receive a power control signal, the controller module 110a is switched to the OFF processing state. On the other hand, the controller module 110b maintains its current state, namely the OFF state, without any change.

In the state of number "3", the controller module 110a is in the "ON" state, and the controller module 110b is in the "ON processing" state. In the case where, in accordance with a previous power control operation, the controller module 110a is placed in the ON state but the controller module 110b is in the ON processing state due to a delay in the ON process of the controller module 110b, the storage apparatus 100 is in the "ON processing" state. In this case, when the controller modules 110a and 110b receive a power control signal, the controller module 110a ignores the received power control signal so as to maintain the controller module 110a in the ON state. The controller module 110b also ignores the received power control signal, and continues the ON process of the controller module 110b.

On the other hand, there may be a case where when the storage apparatus 100 is in the "incorporation processing" state, in which the controller module 110b is newly incorporated into the storage apparatus 100 in operation so as to replace a failed controller module, the controller module 110a is in the "ON" state, and the controller module 110b is in the "ON processing" state. In this case, as in the above case, when the controller modules 110a and 110b receive a power control signal, the controller module 110a ignores the received power control signal so as to maintain the controller module 110a in the ON state. The controller module 110b also ignores the received power control signal, and continues the ON process of the controller module 110b.

In this way, the controller module 110a monitors the state of the controller module 110b, and if the controller module 110b is in the ON processing state when the controller module 110a receives a power control signal, the controller module 110a ignores the power control signal and does not start an OFF process. Accordingly, the power state consistency between the controller modules 110a and 110b is maintained.

In the state of number "4", the controller module 110a is in the "ON" state, and the controller module 110b is in the "OFF processing" state. In the case where the controller module 110b is in the OFF processing state without a disconnection OFF command from the controller module 110a, the storage apparatus 100 is determined to have a "system error" on the basis of the states of the controller modules 110a and 110b. In this case, when the controller modules 110a and 110b receive a power control signal, the controller module 110a sends a disconnection OFF command to the controller module 110b (at this point, the controller module 110b is already in the OFF processing state). Subsequently, the controller module 110a confirms that the controller module 110b is placed in the OFF state, and then starts an OFF process of the controller module 110a. The controller module 110b receives the disconnection OFF command from the controller module 110a. At this point, the controller module 110b is already in the OFF processing state as described above, and therefore continues the OFF process. Further, the controller module 110b is prevented from executing an ON process from then on. In this way, in the case where the state of number "4" appears without a disconnection OFF command from the controller module 110a, when the controller modules 110a and 110b receive a power control signal, the controller module 110a is switched to the OFF processing state. On the other hand, the controller module 110b continues the OFF process, and thus maintains the OFF processing state without any change.

On the other hand, there may be a case where the controller module 110a that is already in the "ON" state sends a disconnection OFF command to the controller module 110b due to detection of an error in the controller module 110b by the controller module 110a, and therefore the controller module 110b is placed in the "OFF processing" state. In this case, the storage apparatus 100 is in the "disconnection processing" state in which the controller module 110a is operating but the controller module 110b is in the OFF processing state. In this case, when the controller modules 110a and 110b receive a power control signal, since the controller module 110a has already sent a disconnection OFF command to the controller module 110b and therefore the controller module 110b is already in the OFF processing state, the controller module 110a starts an OFF process of the controller module 110a. On the other hand, in accordance with the disconnection OFF command, the controller module 110b is already prevented from executing an ON process, and continues the OFF process of the controller module 110b. In this way, in the case where the state of number "4" appears due to a disconnection OFF command that has been previously sent from the controller module 110a, when the controller modules 110a and 110b receive a power control signal, the controller module 110a is switched to the OFF processing state. On the other hand, the controller module 110b continues the OFF process, and thus maintains the OFF processing state without any change.

In the state of number "5", the controller module 110a is in the "OFF" state, and the controller module 110b is in the "ON" state. In the case where the controller module 110a is in the OFF state without a disconnection OFF command from the controller module 110b, the storage apparatus 100 is determined to have a "system error". In this case, when the controller modules 110a and 110b receive a power control signal, the controller module 110b sends a disconnection OFF command to the controller module 110a (at this point, the controller module 110a is already in the OFF state). Subsequently, the controller module 110b confirms that the controller module 110a is placed in the OFF state, and then starts an OFF process of the controller module 110b. The controller module 110a receives the disconnection OFF command from the controller module 110b. Although the controller module 110a is already in the OFF state and therefore does not perform any action at this point, the controller module 110a is prevented from executing an ON process from then on. In this way, in the case where the state of number "5" appears without a disconnection OFF command from the controller module 110b, when the controller modules 110a and 110b receive a power control signal, the controller module 110a maintains its current state, namely the OFF state, without any change. On the other hand, the controller module 110b is switched to the OFF processing state.

On the other hand, there may be a case where the controller module 110b that is already in the "ON" state sends a disconnection OFF command to the controller module 110a due to detection of an error in the controller module 110a by the controller module 110b, and therefore the controller module 110a is placed in the "OFF" state. In this case, the storage apparatus 100 is in the "non-redundant ON" state. In this state, the storage apparatus 100 is in the ON state with the controller module 110b enabled and the controller module 110a disabled. In this case, when the controller modules 110a and 110b receive a power control signal, since the controller module 110b has already sent a disconnection OFF command to the controller module 110a and therefore the controller module 110a is already in the OFF state, the controller module 110b starts an OFF process of the controller module 110b. On the other hand, in accordance with the disconnection OFF command, the controller module 110a is already prevented from executing an ON process, and does not perform any action. In this way, in the case where the state of number "5" appears due to a disconnection OFF command that has been previously sent from the controller module 110b, when the controller modules 110a and 110b receive a power control signal, the controller module 110a maintains its current state without any change. On the other hand, the controller module 110b is switched to the OFF processing state.

In the state of number "6", both the controller modules 110a and 110b are in the "OFF" state. In the case where the controller module 110b is in the OFF state without a disconnection OFF command from the controller module 110a, and the controller module 110a is in the OFF state without a disconnection OFF command from the controller module 110b, the storage apparatus 100 is determined to be in the "OFF" state without any error. In this case, when the controller modules 110a and 110b receive a power control signal, both the controller modules 110a and 110b start an ON process. In this way, in the case where the state of number "6" appears without a disconnection OFF command, when the controller modules 110a and 110b receive a power control signal, both the controller modules 110a and 110b are switched to the ON processing state.

On the other hand, there may be a case where the controller module 110b that is currently in the "OFF" state sends a disconnection OFF command to the controller module 110a due to detection of an error in the controller module 110a by the controller module 110b, and therefore the controller module 110a is placed in the "OFF" state. In this case, the storage apparatus 100 is in a "non-redundant OFF" state. In this state, the storage apparatus 100 is in the OFF state with the controller module 110b enabled and the controller module 110a disabled. In this case, when the controller modules 110a and 110b receive a power control signal, since the controller module 110b has already sent a disconnection OFF command to the controller module 110a and therefore the controller module 110a is already in the OFF state, the controller module 110b starts an OFF process of the controller module 110b. On the other hand, in accordance with the disconnection OFF command, the controller module 110a is already prevented from executing an ON process, and does not perform any action. In this way, in the case where the state of number "6" appears due to a disconnection OFF command that has been previously sent from the controller module 110b, when the controller modules 110a and 110b receive a power control signal, the controller module 110a maintains its current state, namely the OFF state, without any change. On the other hand, the controller module 110b is switched to the OFF processing state.

In the state of number "7", the controller module 110a is in the "OFF" state, and the controller module 110b is in the "ON processing" state. In the case where the controller module 110a is in the OFF state without a disconnection OFF command from the controller module 110b, the storage apparatus 100 is determined to have a "system error" on the basis of the states of the controller modules 110a and 110b. In this case, when the controller modules 110a and 110b receive a power control signal, the controller module 110a ignores the received power control signal so as to maintain the controller module 110a in the OFF state. The controller module 110b ignores the received power control signal, and continues the ON process of the controller module 110b.

On the other hand, there may be a case where the controller module 110b that is currently in the "ON processing" state sends a disconnection OFF command to the controller module 110a due to detection of an error in the controller module 110a by the controller module 110b, and therefore the controller module 110a is placed in the "OFF" state. In this case, the state of the storage apparatus 100 is in a "non-redundant ON processing" state. In this state, the storage apparatus 100 is in the ON processing state with the controller module 110b enabled and the controller module 110a disabled. In this case, when the controller modules 110a and 110b receive a power control signal, since the controller module 110b has already sent a disconnection OFF command to the controller module 110a and therefore the controller module 110a is already in the OFF state, the controller module 110b continues the ON process of the controller module 110b. On the other hand, in accordance with the disconnection OFF command, the controller module 110a is already prevented from executing an ON process, and does not perform any action. Accordingly, the controller module 110a maintains its current state without any change. Meanwhile, the controller module 110b continues the ON process, and thus maintains the ON processing state without any change.

In this way, the controller module 110a having received a disconnection OFF command from the controller module 110b ignores a power control signal, and does not start an ON process based on the power control signal. This prevents activation of the controller module 110a which has been disconnected due to detection of an error.

In the state of number "8", the controller module 110a is in the "OFF" state, and the controller module 110b is in the "OFF processing" state. In the case where the controller module 110a is in the OFF state without a disconnection OFF command from the controller module 110b, the storage apparatus 100 is determined to be in the "OFF processing" state. In this case, when the controller modules 110a and 110b receive a power control signal, the controller module 110a ignores the received power control signal so as to maintain the controller module 110a in the OFF state. The controller module 110b ignores the received power control signal, and continues the OFF process of the controller module 110b.

On the other hand, there may be a case where the controller module 110b that is currently in the "OFF processing" state sends a disconnection OFF command to the controller module 110a due to detection of an error in the controller module 110a by the controller module 110b, and therefore the controller module 110a is placed in the "OFF" state. In this case, the state of the storage apparatus 100 is in a "non-redundant OFF processing" state. In this state, the storage apparatus 100 is in the OFF processing state with the controller module 110b enabled and the controller module 110a disabled. In this case, when the controller modules 110a and 110b receive a power control signal, since the controller module 110b has already sent a disconnection OFF command to the controller module 110a and therefore the controller module 110a is already in the OFF state, the controller module 110b continues the OFF process of the controller module 110b. On the other hand, in accordance with the disconnection OFF command, the controller module 110a is already prevented from executing an ON process, and does not perform any action. Accordingly, the controller module 110a maintains its current state, namely the OFF state, without any change. Meanwhile, the controller module 110b continues the OFF process, and thus maintains the OFF processing state without any change, until completion of the OFF process.

In the state of number "9", the controller module 110a is in the "ON processing" state. On the other hand, the controller module 110b may be in any power state. In this case, when the controller modules 110a and 110b receive a power control signal, the controller modules 110a continues the ON process of the controller module 110a. Since the ON process is continued, the controller module 110a maintains the ON processing state without any change. Further, in the case where the controller module 110b is not powered ON even after the lapse of a predetermined time period, the controller module 110a determines that an error has occurred in the controller module 110b, and sends a disconnection OFF command to the controller module 110b.

In the state of number "10", the controller module 110a is in the "OFF processing" state. On the other hand, the controller module 110b may be in any power state. In this case, when the controller modules 110a and 110b receive a power control signal, the controller modules 110a continues the OFF process of the controller module 110a. Since the OFF process is continued, the controller module 110a maintains the OFF processing state without any change. Further, in the case where the controller module 110b is not powered ON even after the lapse of a predetermined time period, the controller module 110a determines that an error has occurred in the controller module 110b, and sends a disconnection OFF command to the controller module 110b.

Figure 7:
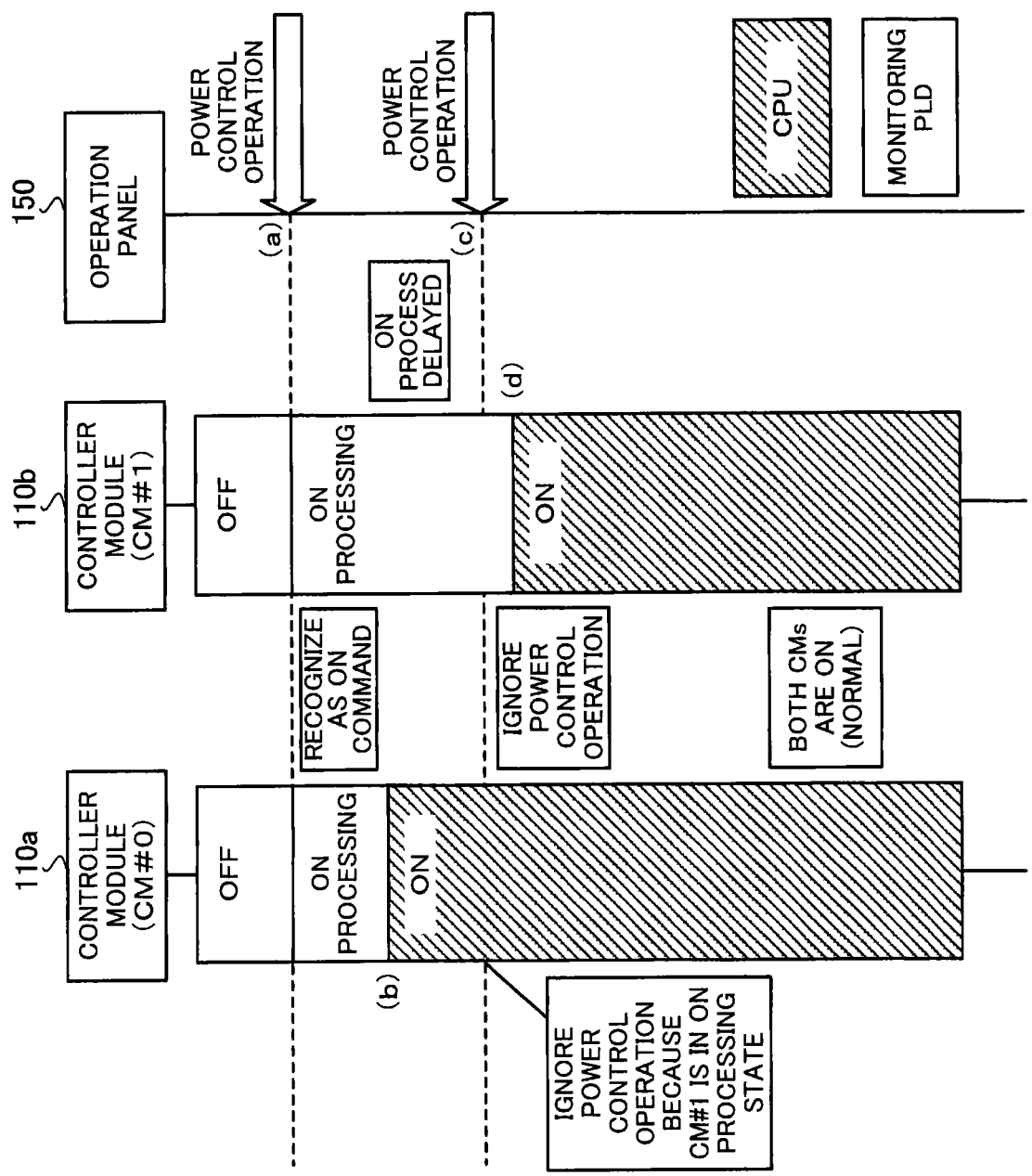
FIG. 7 illustrates the action taken by each controller module in an OFF state in response to a power control operation according to the second embodiment.

FIG. 7 illustrates the action taken by each controller module in the OFF state in response to a power control operation according to the second embodiment. It is assumed that, in the case where the user performs a power control operation on the storage apparatus 100 in the OFF state, the ON process of one of the controller modules (for example, the controller module 110b) is delayed, so that although the controller module 110a is placed in the ON state, the controller module 110b is in the ON processing state. According to this embodiment, even if the user performs a power control operation in this situation, it is possible to prevent inconsistency from arising in the manner described below with reference to FIG. 7.

As illustrated in FIG. 7, the storage apparatus 100 of this embodiment is configured such that, in the controller module 110a, the CPU 111a controls the operation indicated by the shaded area of FIG. 7, and the monitoring PLD 114a controls the operation indicated by the white area of FIG. 7. Similarly, in the controller module 110b, the CPU 111b controls the operation indicated by the shaded area, and the monitoring PLD 114b controls the operation indicated by the white area. Further, the controller modules 110a and 110b are initially in the OFF state. At this point, as illustrated in (a) of FIG. 7, in order to activate the storage apparatus 100, the user performs the first power control operation using the power control button on the operation panel 150. Then, a power control signal is output in accordance with the power control operation of (a). This power control signal is recognized by the monitoring PLD 114a as an ON command for turning ON the controller module 110a and is recognized by the monitoring PLD 114b as an ON command for turning ON the controller module 110b. Thus, an ON process for turning ON the power is started in each of the controller modules 110a and 110b.

Then, as illustrated in (b) of FIG. 7, the ON process in the controller module 110a is completed under the control of the monitoring PLD 114a, so that the controller module 110a is powered ON. On the other hand, at the point of (b), the ON process in the controller module 110b under the control of the monitoring PLD 114b is delayed, so that the controller module 110b is in the ON processing state.

Then, as illustrated in (c) of FIG. 7, while the delayed ON process of the controller module 110b is being executed, the user performs the second power control operation because the activation of the storage apparatus 100 is not completed. As illustrated in the state of number "3" in FIG. 4, the controller module 110b in the ON processing state recognizes a power control signal corresponding to the power control operation of (c) as an ON command, and therefore continues the ON process. Since the controller module 110b is in the ON processing state, the controller module 110a in the ON state ignores the power control signal corresponding to the power control operation so as to remain in the ON state.

Then, as illustrated in (d) of FIG. 7, the ON process in the controller module 110b is completed under the control of the monitoring PLD 114b, so that the controller module 110b is powered ON. On the other hand, at this point, the ON process in the controller module 110a is already completed under the control of the monitoring PLD 114a, and therefore the controller module 110a is in the ON state.

In this manner, according to this embodiment, even if the states of the controller modules 110a and 110b do not match each other at the point of (c) when the second power control operation is performed, it is possible to place the controller modules 110a and 110b in the same state, namely the ON state, at the point of (d). This makes it possible to prevent state inconsistency between the controller modules 110a and 110b.

Figure 8:
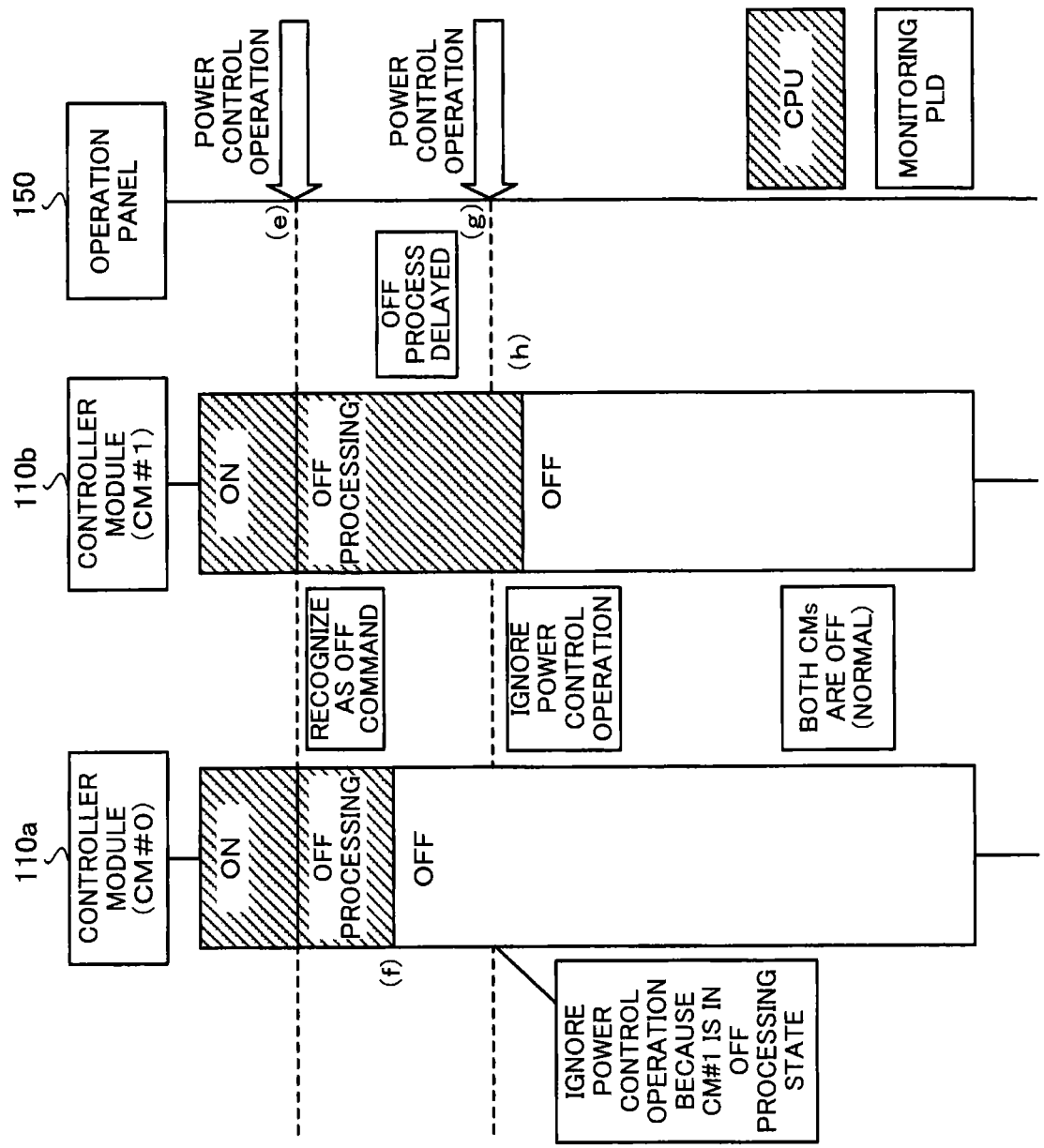
FIG. 8 illustrates the action taken by each controller module in an ON state in response to a power control operation according to the second embodiment.

FIG. 8 illustrates the action taken by each controller module in the ON state in response to a power control operation according to the second embodiment. It is assumed that, in the case where the user performs a power control operation on the storage apparatus 100 in the ON state, the OFF process of one of the controller modules (for example, the controller module 110b) is delayed, so that although the controller module 110a is placed in the OFF state, the controller module 110b is in the OFF processing state. According to this embodiment, even if the user performs a power control operation in this situation, it is possible to prevent inconsistency from arising in the manner described below with reference to FIG. 8.

As illustrated in FIG. 8, as in the case of FIG. 7, the storage apparatus 100 of this embodiment is configured such that, in the controller module 110a, the CPU 111a controls the operation indicated by the shaded area of FIG. 8, and the monitoring PLD 114a controls the operation indicated by the white area of FIG. 8. Similarly, in the controller module 110b, the CPU 111b controls the operation indicated by the shaded area, and the monitoring PLD 114b controls the operation indicated by the white area. Further, the controller modules 110a and 110b are initially in the ON state. At this point, as illustrated in (e) of FIG. 8, in order to terminate operations of the storage apparatus 100, the user performs the first power control operation using the operation panel 150. Then, a power control signal is output in accordance with the power control operation of (e). This power control signal is recognized by the CPU 111a as an OFF command for turning OFF the controller module 110a and is recognized by the CPU 111b as an OFF command for turning OFF the controller module 110b. Thus, an OFF process for turning OFF the power is started in each of the controller modules 110a and 110b.

Then, as illustrated in (f) of FIG. 8, the OFF process in the controller module 110a is completed under the control of the CPU 111a, so that the controller module 110a is powered OFF. On the other hand, at the point of (f), the OFF process in the controller module 110b under the control of the CPU 111b is delayed, so that the controller module 110b is in the OFF processing state.

Then, as illustrated in (g) of FIG. 8, while the delayed OFF process of the controller module 110b is being executed, the user performs the second power control operation because the power-OFF of the storage apparatus 100 is not completed. As illustrated in the state of number "8" in FIG. 5, the controller module 110b in the OFF processing state recognizes a power control signal corresponding to the power control operation of (g) as an OFF command, and therefore continues the OFF process. Since the controller module 110b is in the OFF processing state, the controller module 110a in the OFF state ignores the power control signal corresponding to the power control operation so as to remain in the OFF state.

Then, as illustrated in (h) of FIG. 8, the OFF process in the controller module 110b is completed under the control of the CPU 111b, so that the controller module 110b is powered OFF. On the other hand, at this point, the OFF process in the controller module 110a is already completed under the control of the CPU 111a, and therefore the controller module 110a is in the OFF state.

In this manner, according to this embodiment, even if the states of the controller modules 110a and 110b do not match each other at the point of (g) at which the second power control operation is performed, it is possible to place the controller modules 110a and 110b in the same state, namely the OFF state, at the point of (h). This makes it possible to prevent state inconsistency between the controller modules 110a and 110b.

Figure 9:
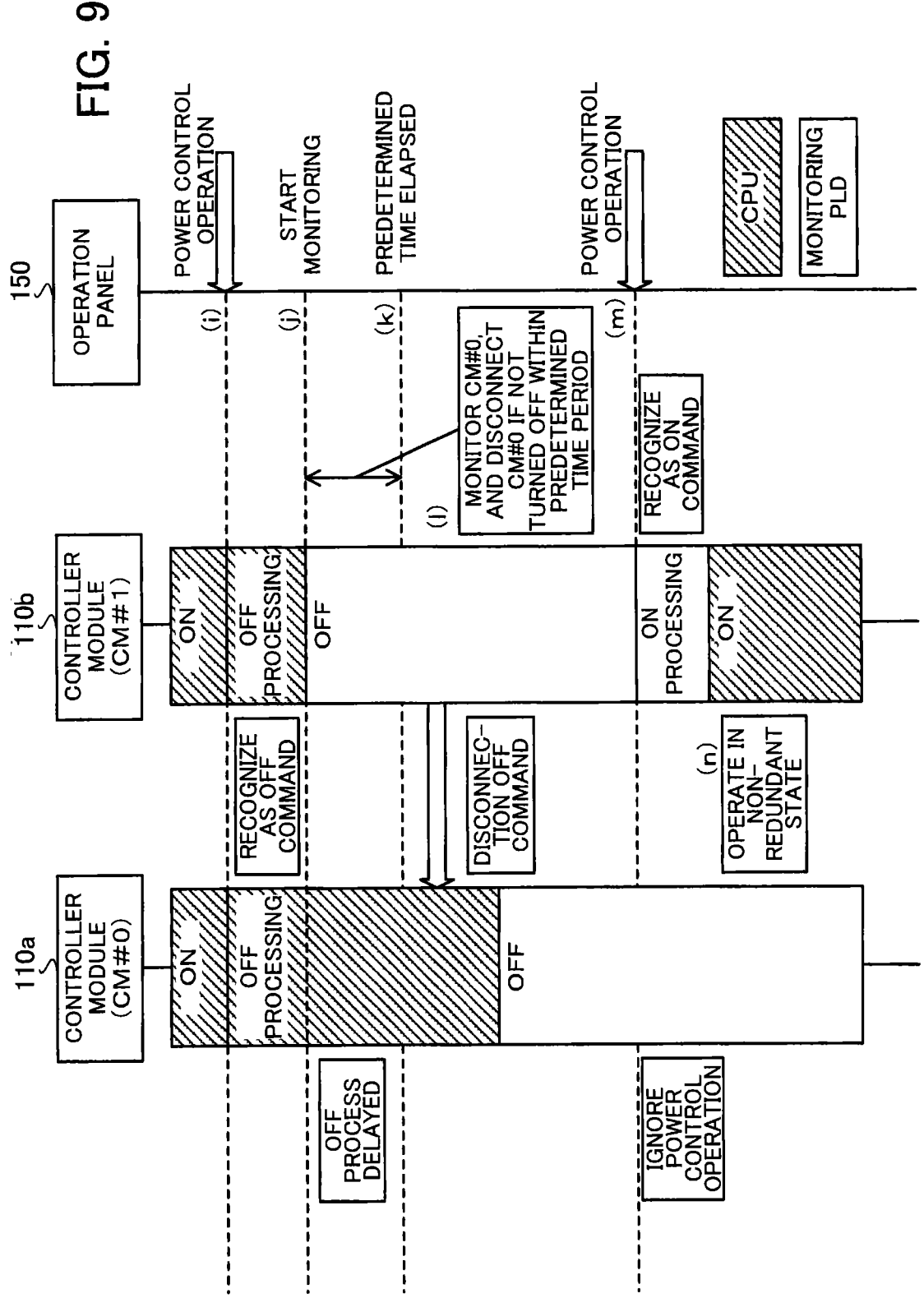
FIG. 9 illustrates a disconnection operation performed by each controller module in an OFF processing state in response to a power control operation according to the second embodiment.

FIG. 9 illustrates a disconnection operation performed by each controller module in the OFF processing state in response to a power control operation according to the second embodiment. It is assumed that, in the case where the user performs a power control operation on the storage apparatus 100 in the ON state, the OFF process of one of the controller modules (for example, the controller module 110a) is delayed due to an error occurred therein, so that although the controller module 110b is placed in the OFF state, the controller module 110a is in the OFF processing state. Further, in this case, it is assumed that the controller module 110b that is operating normally detects an error in the controller module 110*a*, and disconnects the controller module 110*a*. According to this embodiment, even if the user performs a power control operation in this situation, it is possible to prevent inconsistency from arising in the manner described below with reference to FIG. 9.

As illustrated in FIG. 9, as in the case of FIG. 7, the storage apparatus 100 of this embodiment is configured such that, in the controller module 110*a*, the CPU 111*a* controls the operation indicated by the shaded area of FIG. 9, and the monitoring PLD 114*a* controls the operation indicated by the white area of FIG. 9. Similarly, in the controller module 110*b*, the CPU 111*b* controls the operation indicated by the shaded area, and the monitoring PLD 114*b* controls the operation indicated by the white area. Further, the controller modules 110*a* and 110*b* are initially in the ON state. At this point, as illustrated in (i) of FIG. 9, in order to terminate operations of the storage apparatus 100, the user performs the first power control operation using the operation panel 150. Then, a power control signal is output in accordance with the power control operation of (i). This power control signal is recognized by the CPU 111*a* as an OFF command for turning OFF the controller module 110*a* and is recognized by the CPU 111*b* as an OFF command for turning OFF the controller module 110*b*. Thus, an OFF process for turning OFF the power is started in each of the controller modules 110*a* and 110*b*.

Then, as illustrated in (j) of FIG. 9, the OFF process in the controller module 110*b* is completed under the control of the CPU 111*b*, so that the controller module 110*b* is powered OFF. On the other hand, at the point of (j), the OFF process in the controller module 110*a* is delayed due to an error occurred therein, so that the controller module 110*a* is in the OFF processing state. The controller modules 110*a* and 110*b* of this embodiment monitor the state of each other, using the monitoring PLDs 114*a* and 114*b*, respectively. In this step, the monitoring PLD 114*b* of the controller module 110*b* monitors whether the controller module 110*a* is powered OFF before the point of (k) of FIG. 9 at which a predetermined time period (e.g., one second) elapses after the power-OFF of the controller module 110*b*.

Then, as illustrated in (l) of FIG. 9, since the controller module 110*a* is not powered ON even at the point of (k) after the lapse of the predetermined time period, the monitoring PLD 114*b* sends an OFF command to the monitoring PLD 114*a* of the controller module 110*a* and executes disconnection of the controller module 110*a*. Then, under the control of the monitoring PLD 114*a* that has received the disconnection OFF command, the controller module 110*a* is powered OFF. In this case, the control of the monitoring PLD 114*a* that has received the disconnection OFF command ignores a power control signal and does not execute an ON process of the controller module 110*a*. Therefore, the controller module 110*a* is maintained in the OFF state.

As illustrated in (m) of FIG. 9, the user performs the second power control operation. As illustrated in the state of number "5" in FIG. 5, the controller module 110*a* that has received the disconnection OFF command from the controller module 110*b* in (l) ignores a power control signal corresponding to the power control operation of (m) so as to remain in the OFF state. On the other hand, the controller module 110*b* in the OFF state recognizes the power control signal as an ON command, and therefore executes an ON process.

Then, as illustrated in (n) of FIG. 9, the ON process in the controller module 110*b* is completed under the control of the monitoring PLD 114*b*, so that the controller module 110*b* is powered ON. Meanwhile, the controller module 110*a* is disconnected and therefore remains OFF. Thus, the storage apparatus 100 operates in the non-redundant state with the controller module 110*b* enabled and the controller module 110*a* is disabled (i.e., the storage apparatus 100 is in the "non-redundant ON" state).

In this manner, according to this embodiment, even if the states of the controller modules 110*a* and 110*b* do not match each other due to an error occurring in the controller module 110*a*, as with the point of (k), the monitoring PLD 114*b* of the controller module 110*b* monitors the state of the controller module 110*a* and detects the error. Then, at the point of (l), the monitoring PLD 114*b* sends to the monitoring PLD 114*a* a disconnection OFF command for disconnecting and turning OFF the controller module 110*b*. Thus, the storage apparatus 100 operates with the controller module 110*b* disconnected. This makes it possible to prevent the controller module 110*b* with the error from operating and causing a problem.

Figure 10:
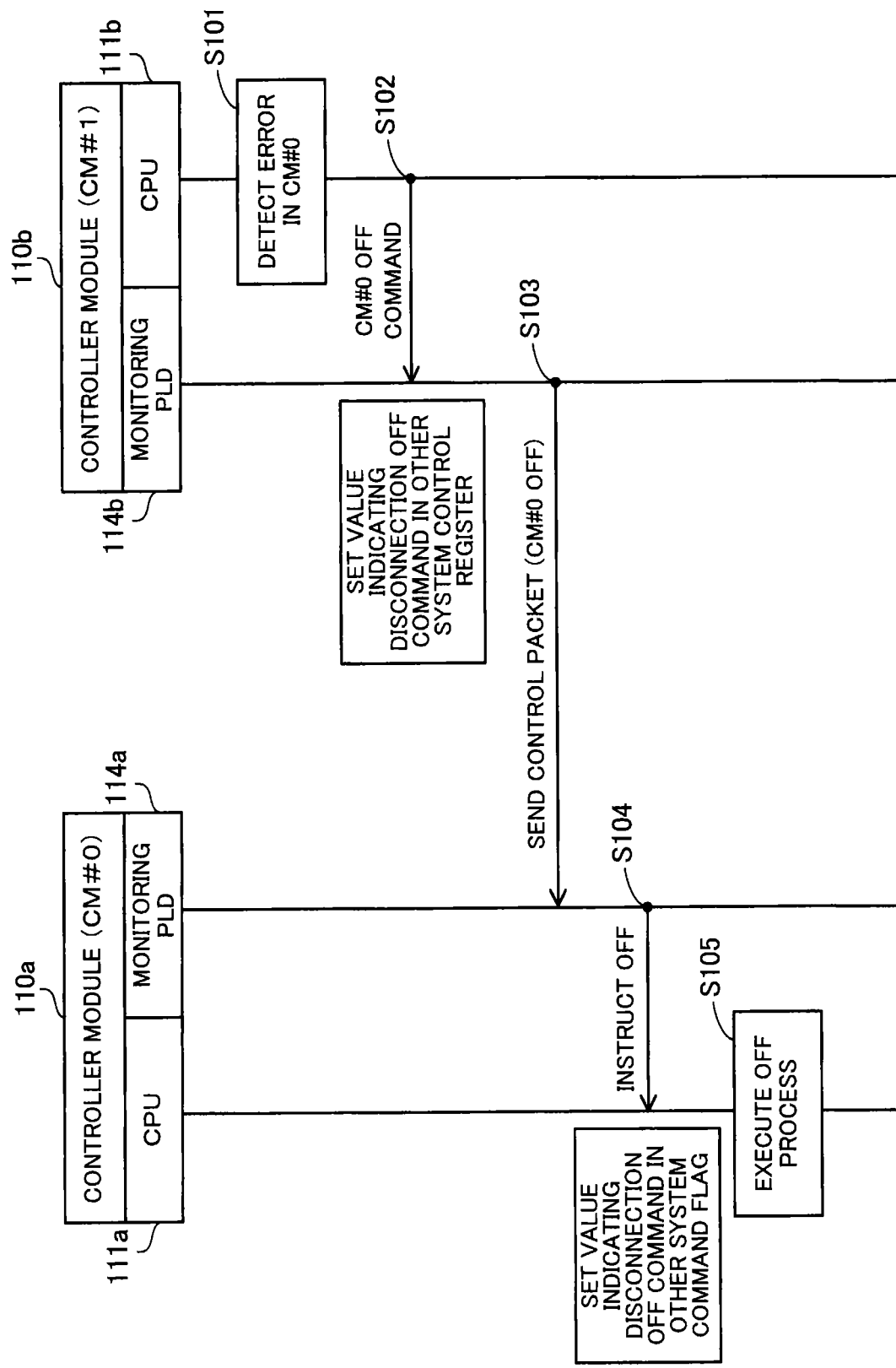
FIG. 10 is a sequence diagram illustrating operations of monitoring the state of the other system according to the second embodiment.
Figure 11:
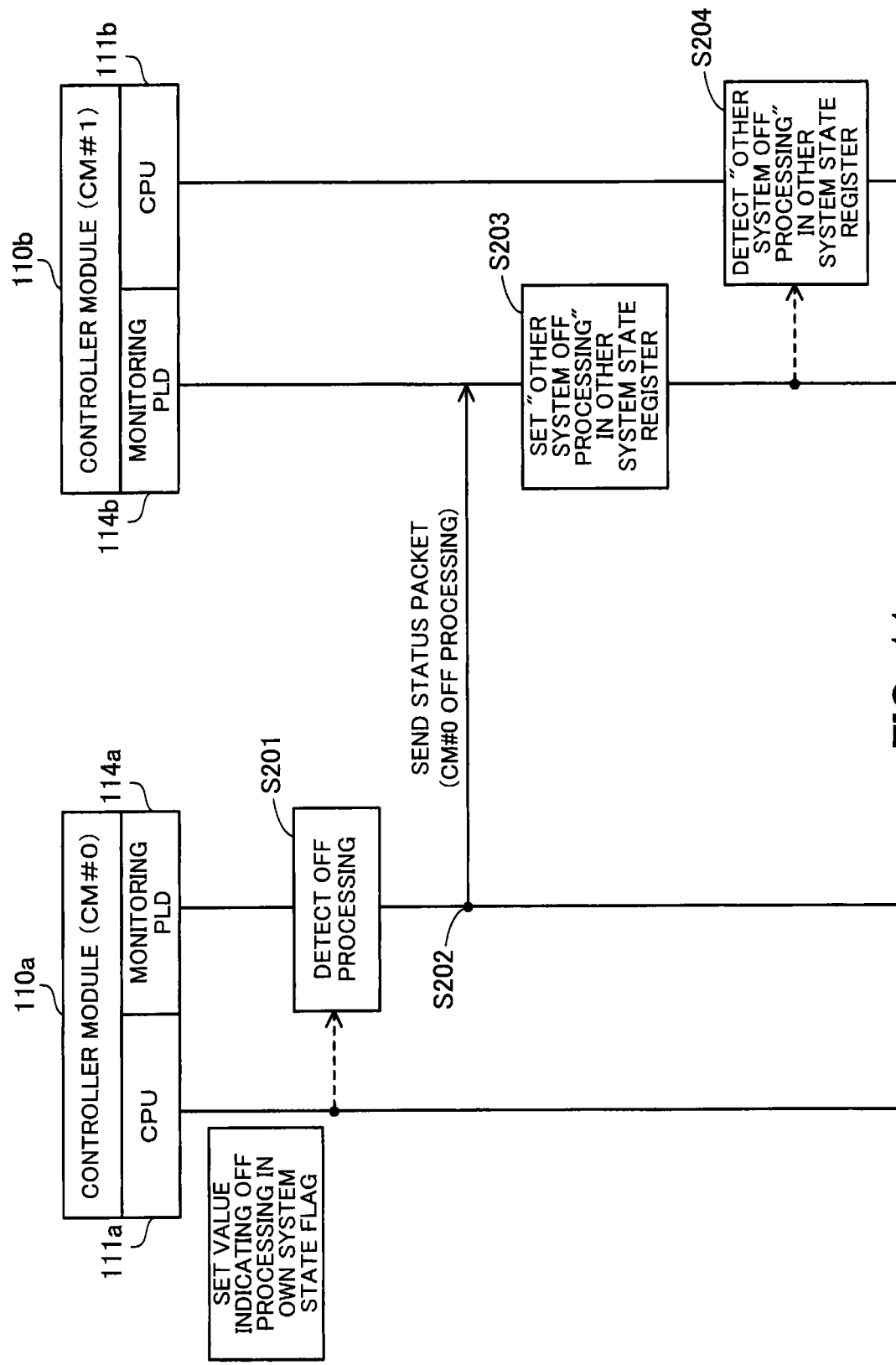
FIG. 11 is a sequence diagram illustrating operations of monitoring the state of the other system according to the second embodiment.
Figure 12:
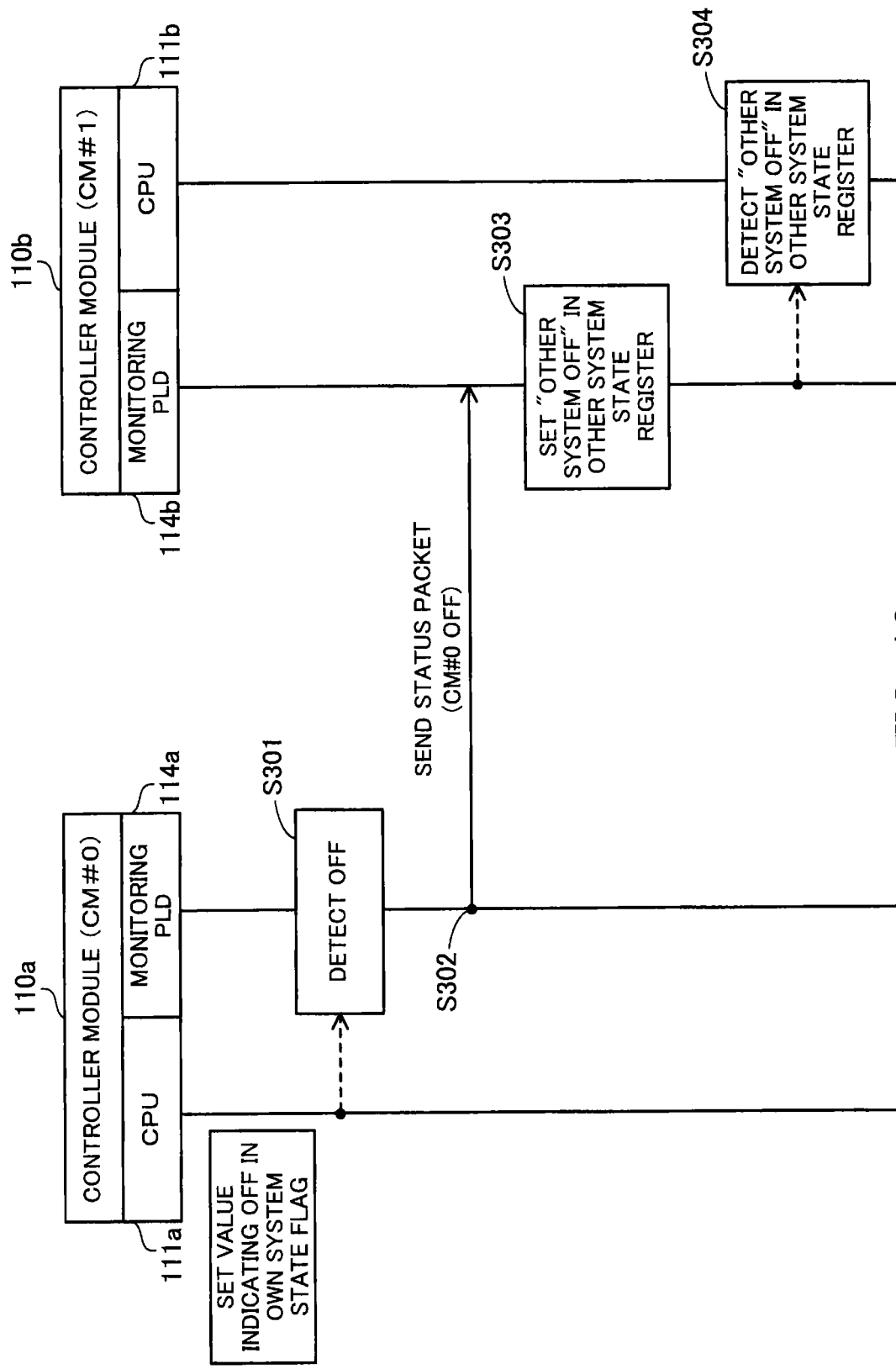
FIG. 12 is a sequence diagram illustrating operations of monitoring the state of the other system according to the second embodiment.

FIGS. 10 through 12 are sequence diagrams illustrating operations of monitoring the state of the other system according to the second embodiment. In the storage apparatus 100 of this embodiment, the controller modules 110*a* and 110*b* monitor the state of each other, using the monitoring PLDs 114*a* and 114*b*, respectively. If one of the controller modules 110*a* and 110*b* (for example, the controller module 110*b*) detects an error in the other system (for example, the controller module 110*a*), the controller module 110*b* sends a disconnection OFF command to the controller module 110*a* with the error. Having received the disconnection OFF command from the controller module 110*b*, the controller module 110*a* with the error executes an OFF process of the controller module 110*a* so as to turn OFF the controller module 110*a*. Then, the controller module 110*b* confirms that the state of the controller module 110*a* is changed. The following describes the procedure of detecting an error in the controller module 110*a*, sending an OFF command from the controller module 110*b* to the controller module 110*a*, powering OFF the controller module 110*a*, and confirming the power-OFF of the controller module 110*a*, with reference to FIGS. 10 through 12.

(Step S101) The CPU 111*b* detects an error in the controller module 110*a* on the basis of the time taken to execute an OFF process of the controller module 110*a* or the like, for example.

(Step S102) The CPU 111*b* controls the monitoring PLD 114*b* to send a disconnection OFF command to the controller module 110*a* so as to send a disconnection OFF command to the controller module 110*a*. More specifically, the CPU 111*b* sets, in the other system control register of the monitoring PLD 114*b* which indicates a command to the other system, a value indicating a disconnection OFF command to the controller module 110*a*.

(Step S103) When the value indicating a disconnection OFF command to the controller module 110*a* is set in the other system control register by the CPU 111*b* in Step S102, the monitoring PLD 114*b* sends to the monitoring PLD 114*a* a control packet indicating an OFF command to the controller module 110*a*.

(Step S104) Having received the control packet indicating an OFF command to the controller module 110*a* which is sent from the monitoring PLD 114*b* in Step S103, the monitoring PLD 114*a* instructs the CPU 111*a* to perform a disconnection OFF of the controller module 110*a*. More specifically, the monitoring PLD 114*a* sets, in the other system command flag of the CPU 111*b* which indicates a command from the other system, a value indicating a disconnection OFF command to the controller module 110*a*.

Further, since the monitoring PLD 114*a* has received from the monitoring PLD 114*b* the disconnection OFF command to the controller module 110*a*, the monitoring PLD 114*a* ignores future power control signals. Thus, the controller module 110a does not perform an ON process from then on. This makes it possible to prevent the controller module 110a with the error from operating and causing a problem.

(Step S105) Since the value indicating a disconnection OFF command to the controller module 110a is set in the other system command flag by the monitoring PLD 114a in Step S104, the CPU 111a executes an OFF process of the controller module 110a.

(Step S201) The monitoring PLD 114a obtains the value of the own system state flag indicating the state of the controller module 110a, and thereby detects the OFF processing state of the controller module 110a.

(Step S202) Since the OFF processing state of the controller module 110a is detected in Step S201, the monitoring PLD 114a sends a status packet indicating the OFF processing state of the controller module 110a to the monitoring PLD 114b.

(Step S203) Having received the status packet indicating the OFF processing state of the controller module 110a which is sent from the monitoring PLD 114a in Step S202, the monitoring PLD 114b sets, in the other system state register of the monitoring PLD 114b which indicates the state of the other system, a value indicating the OFF processing state of the controller module 110a.

(Step S204) The CPU 111b obtains the value of the other system state register, and detects the OFF processing state of the controller module 110a, on the basis of the value of the other system state register indicating the OFF processing state of the controller module 110a, which is set by the monitoring PLD 114b in Step S203.

(Step S301) The monitoring PLD 114a obtains the value of the own system state flag, and detects the OFF state of the controller module 110a.

(Step S302) Since the OFF state of the controller module 110a is detected in Step S301, the monitoring PLD 114a sends a status packet indicating the OFF state of the controller module 110a to the monitoring PLD 114b.

(Step S303) Having received the status packet indicating the OFF state of the controller module 110a which is sent from the monitoring PLD 114a in Step S302, the monitoring PLD 114b sets, in the other system state register, a value indicating the OFF state of the controller module 110a.

(Step S304) The CPU 111b obtains the value of the other system state register, and detects the OFF state of the controller module 110a, on the basis of the value of the other system state register indicating the OFF state of the controller module 110a, which is set by the monitoring PLD 114b in Step S303. Thus, the controller module 110b confirms that the controller module 110a with the error is in the OFF state.

As described above, in the storage apparatus 100 of the second embodiment, if, for example, the monitoring results indicate that the controller module 110a is in the ON state and the controller module 110b is in the ON processing state, even when a power control signal is detected, the controller module 110a is maintained in the ON state. This prevents, in the above situation, the controller module 110a from starting execution of an OFF process of switching its power state from ON to OFF, and also prevents the controller module 110b from switching its power state to OFF. This makes it possible to prevent power state inconsistency between the controller modules 110a and 110b of the storage apparatus 100.

Further, if the controller module 110a is in the OFF state and the controller module 110b is in the OFF processing state, even when a power control signal for controlling the power state of the controller module 110a is detected, the controller module 110a is maintained in the OFF state. This prevents, in the above situation, the controller module 110a from starting execution of an ON process of switching its power state from OFF to ON, and also prevents the controller module 110b from switching its power state to ON. This makes it possible to prevent power state inconsistency between the controller modules 110a and 110b of the storage apparatus 100.

Further, if the controller modules 110a and 110b are in the ON state, the CPUs 111a and 111b control the power states of the controller modules 110a and 110b, respectively. On the other hand, if the controller modules 110a and 110b are not in the ON state and are in any of the OFF, ON processing, and OFF states, the monitoring PLDs 114a and 114b control the power states of the controller modules 110a and 110b, respectively. With this configuration, when the controller modules 110a and 110b are in the OFF state or the like, the monitoring PLDs 114a and 114b may control the power state. Further, when the controller modules 110a and 110b are in the OFF state, as long as the power is supplied to the monitoring PLDs 114a and 114b so as to control the power state, there is no need to supply power to the CPUs 111a and 111b. Therefore, it is possible to reduce power consumption during the OFF state of the controller modules 110a and 110b.

Further, if the controller module 110a detects an error in the controller module 110b, the controller module 110a sends a disconnection OFF command to the controller module 110b. Thus, the controller module 110b is powered OFF (or remains OFF). Accordingly, in the case where an error occurs in the controller module 110b, it is possible to disable the controller module 110b and thus to prevent a problem from arising and expanding due to the error.

Further, if the controller module 110b detects a disconnection OFF command from the controller module 110a, the controller module 110b is switched to the OFF state, and ignores future power control signals so as not to start execution of an ON process. Accordingly, in the case where an error occurs in the controller module 110b, it is possible to disable the controller module 110b and thus to prevent a problem from arising and expanding due to the error.

Further, in the case where an OFF process is executed in each of the controller modules 110a and 110b in accordance with a power control signal, if the OFF process of the controller module 110b is not completed within the predetermined time period after the controller module 110a is switched to the OFF state, the controller module 110a determines that an error has occurred in the controller module 110b. Thus, it is possible to detect an error, such as hang-up or the like, which occurred during the OFF process of the controller module 110b.

Further, the monitoring PLD 114a receives from the monitoring PLD 114b a status packet indicating the state of the controller module 110b, and obtains and monitors the state of the controller module 110b on the basis of the received status packet. Thus, even if the controller module 110a is not in the ON state, the controller module 110a may monitor the state of the controller module 110b, and may control the states of the controller modules 110a and 110b on the basis of the monitoring results.

Further, the same power control signal serves as an ON command and an OFF command to the controller modules 110a and 110b. This makes it possible to simplify the configuration of the controller modules 110a and 110b and the operation panel 150, and to simplify communication with the host computer 300.

Further, if the controller module 110a is in the ON processing state, even when a power control signal is detected, the controller module 110a is maintained in the ON processing state until completion of the ON process of the controller module 110a. Accordingly, even if a power control signal is detected during the ON process of the controller module 110a, it is possible to prevent power state inconsistency between the controller modules 110a and 110b.

Further, if the controller module 110a is in the OFF processing state, even when a power control signal is detected, the controller module 110a is maintained in the OFF processing state until completion of the OFF process of the controller module 110a. Accordingly, even if a power control signal is detected during the OFF process of the controller module 110a, it is possible to prevent power state inconsistency between the controller modules 110a and 110b.

According to the disclosed storage apparatus, controller module, and storage apparatus control method, it is possible to prevent power state inconsistency between controller modules of the storage apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus comprising:
   first and second controller modules,
   wherein the first controller module monitors power states of the first and second controller modules, and when the first controller module whose power state is an ON state detects a power control signal for switching the power state of the first controller module from ON to OFF and the power state of the second controller module is an ON processing state in which an ON process of switching from OFF to ON is being executed, the first controller module maintains the power state of the first controller module by ignoring the power control signal.

2. The storage apparatus according to claim 1, wherein the first controller module monitors the power states of the first and second controller modules, and when the power state of the first controller module is an OFF state and the power state of the second controller module is an OFF processing state in which an OFF process of switching from ON to OFF is being executed, the first controller module maintains the power state of the first controller module upon detection of a power control signal for controlling the power state of the first controller module.

3. The storage apparatus according to claim 1, wherein the first controller module includes
   a first arithmetic unit configured to operate when the power state of the first controller module is the ON state so as to monitor the power states of the first and second controller modules, and configured to, on the basis of monitoring results, control the power state of the first controller module and send to the second controller module a command for controlling the power state of the second controller module, and
   a first monitoring unit configured to monitor the power states of the first and second controller modules when the first controller module is not operating, and configured to, on the basis of monitoring results, control the power state of the first controller module and send to the second controller module a command for controlling the power state of the second controller module.

4. The storage apparatus according to claim 1, wherein:
   when the first controller module detects an error in the second controller module, the first controller module sends to the second controller module a disconnection OFF command for placing the second controller module in an OFF state and preventing execution of an ON process; and
   when the second controller module receives the disconnection OFF command from the first controller module, the second controller module switches the power state of the second controller module to the OFF state.

5. The storage apparatus according to claim 4, wherein when the second controller module receives the disconnection OFF command from the first controller module, the second controller module switches the power state of the second controller module to the OFF state, and does not switch the power state of the second controller module to the ON state upon detection of a power control signal for controlling the power state of the second controller module until receipt of cancellation of the disconnection OFF command from the first controller module.

6. The storage apparatus according to claim 4, wherein:
   the first controller module includes a monitoring unit configured to monitor the power states of the first and second controller modules when the first controller module is not operating, and
   upon executing an OFF process of switching the power state from ON to OFF in each of the first and second controller modules in accordance with the power control signal, when the OFF process of the second controller module is not completed within a predetermined time period after the first controller module is switched to the OFF state, the monitoring unit determines that an error has occurred in the second controller module, and detects the error in the second controller module on the basis of the determination.

7. The storage apparatus according to claim 4, wherein upon executing the ON process in the first and second controller modules in accordance with the power control signal, when the ON process of the second controller module is not completed within a predetermined time period after the first controller module is switched to the ON state, the first controller module determines that an error has occurred in the second controller module, and detects the error in the second controller module on the basis of the determination.

8. The storage apparatus according to claim 3, wherein the first monitoring unit receives a report from a second monitoring unit of the second controller module, the report indicating the power state of the second controller module, and monitors the power state of the second controller module on the bases of the received report indicating the power state of the second controller module.

9. The storage apparatus according to claim 1, wherein the same power control signal serves as an ON command for instructing the first or second controller module to switch the power state from OFF to ON, and an OFF command for instructing the first or second controller module to switch the power state from ON to OFF.

10. The storage apparatus according to claim 1, wherein when the power state of the first controller module is an ON processing state in which an ON process of switching from OFF to ON is being executed, the first controller module maintains the power state of the first controller module upon detection of a power control signal for controlling the power state of the first controller module.

11. The storage apparatus according to claim 1, wherein when the power state of the first controller module is an OFF processing state in which an OFF process of switching from ON to OFF is being executed, the first controller module maintains the power state of the first controller module upon detection of a power control signal for controlling the power state of the first controller module.

12. The storage apparatus according to claim 1, further comprising:
an operation unit that receives an operation and outputs a power control signal in accordance with the received operation;
wherein the first controller module detects the power control signal output from the operation unit.

13. The storage apparatus according to claim 1, wherein the first controller module detects a power control signal output from an upper apparatus.

14. A controller module that is used as a first controller module and controls a storage apparatus together with a second controller module, wherein the first controller module is configured to monitor power states of the first controller module and the second controller module, and when the first controller module whose power state is an ON state detects a power control signal for switching the power state of the first controller module from ON to OFF and the power state of the second controller module is an ON processing state in which an ON process of switching from OFF to ON is being executed, the first controller module maintains the power state of the first controller module by ignoring the power control signal.

15. A storage apparatus control method that controls a storage apparatus by first and second controller modules, the method comprising:
monitoring power states of the first and second controller modules;
detecting, when the power state of the first controller module is an ON state, a power control signal for switching the power state of the first controller module from ON to OFF; and
maintaining, when the power state of the second controller module is an ON processing state in which an ON process of switching from OFF to ON is being executed, the power state of the first controller module by ignoring the power control signal.

16. The storage apparatus control method according to claim 15, wherein the monitoring includes causing the first and second controller modules to monitor the power state of each other.

* * * * *